US012650755B2

(12) United States Patent
Kaasila et al.

(10) Patent No.: US 12,650,755 B2
(45) Date of Patent: ***Jun. 9, 2026

(54) USING ATTRIBUTES FOR FONT RECOMMENDATIONS

(71) Applicant: Monotype Imaging Inc., Woburn, MA (US)

(72) Inventors: Sampo Juhani Kaasila, Plaistow, NH (US); Jitendra Kumar Bansal, Karauli (IN); Prince Dhiman, Manimajra (IN); Mayur G. Warialani, Vadodara (IN)

(73) Assignee: Monotype Imaging Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,246

(22) Filed: Dec. 23, 2022

(65) Prior Publication Data

US 2023/0384910 A1 Nov. 30, 2023

Related U.S. Application Data

(63) Continuation of application No. 15/215,248, filed on Jul. 20, 2016, now Pat. No. 11,537,262.
(Continued)

(51) Int. Cl.
*G06F 3/0482* (2013.01)
*G06F 40/109* (2020.01)
(Continued)

(52) U.S. Cl.
CPC .......... *G06F 3/0482* (2013.01); *G06F 40/109* (2020.01); *G06F 40/14* (2020.01); *G06N 20/00* (2019.01)

(58) Field of Classification Search
CPC ...... G06F 3/0482; G06F 40/14; G06F 40/109; G06N 20/00
See application file for complete search history.

(56) References Cited

U.S. PATENT DOCUMENTS 4,244,657 A 1/1981 Wasylyk
4,998,210 A 3/1991 Kadono et al.
(Continued)

FOREIGN PATENT DOCUMENTS

EP 0949574 10/1999
EP 2166488 A2 3/2010
(Continued)

OTHER PUBLICATIONS

"A first experiment with multicoloured web fonts," Manufactura Independente website, Feb. 28, 2011, Retrieved from the internet: http://blog.manufacturaindependente.org/2011/02/a-first-experiment-with-multicoloured-web-fonts/.
(Continued)

*Primary Examiner* — Maikhanh Nguyen
(74) *Attorney, Agent, or Firm* — Fish & Richardson P.C.

(57) ABSTRACT

A system includes a computing device that includes a memory configured to store instructions. The computing device also includes a processor to execute the instructions to perform operations that include receiving data representing one or more user-selected item attributes. The data includes one of at least four selectable interest levels for each of the one or more user-selected item attributes. Operations also include identifying one or more items representative of the selected interest level for each of the one or more user-selected item attributes, and initiating delivery of data representing the identified one or more items for user selection.

21 Claims, 11 Drawing Sheets

1000

Receiving data representing one or more user-selected item attributes, the data includes one of at least four selectable interest levels for each of the one or more user-selected item attributes — 1002

Identifying one or more items representative of the selected interest level for each of the one or more user-selected item attributes — 1004

Initiating delivery of data representing the identified one or more items for selection by the user — 1006

Related U.S. Application Data

(60) Provisional application No. 62/195,165, filed on Jul. 21, 2015.

(51) Int. Cl.
　　*G06F 40/14*　　　(2020.01)
　　*G06N 20/00*　　　(2019.01)

(56) References Cited

U.S. PATENT DOCUMENTS

| | | | |
|---|---|---|---|
| 5,263,132 A | 11/1993 | Parker et al. | |
| 5,347,266 A | 9/1994 | Bauman et al. | |
| 5,410,640 A * | 4/1995 | Morikawa | G06K 15/02 |
| | | | 358/1.11 |
| 5,412,771 A | 5/1995 | Fenwick | |
| 5,416,898 A | 5/1995 | Opstad et al. | |
| 5,444,829 A | 8/1995 | Kawabata et al. | |
| 5,453,938 A | 9/1995 | Gohara et al. | |
| 5,500,931 A * | 3/1996 | Sonnenschein | G06F 40/109 |
| | | | 345/170 |
| 5,526,477 A | 6/1996 | McConnell et al. | |
| 5,528,742 A | 6/1996 | Moore et al. | |
| 5,533,174 A | 7/1996 | Flowers et al. | |
| 5,586,242 A | 12/1996 | McQueen et al. | |
| 5,606,649 A | 2/1997 | Tai | |
| 5,619,721 A | 4/1997 | Maruko | |
| 5,630,028 A | 5/1997 | DeMeo | |
| 5,737,599 A | 4/1998 | Rowe et al. | |
| 5,748,975 A | 5/1998 | Van De Vanter | |
| 5,757,384 A | 5/1998 | Ikeda | |
| 5,761,395 A | 6/1998 | Miyazaki et al. | |
| 5,781,714 A | 7/1998 | Collins et al. | |
| 5,877,776 A | 3/1999 | Beaman et al. | |
| 5,926,189 A | 7/1999 | Beaman et al. | |
| 5,940,581 A | 8/1999 | Lipton | |
| 5,995,718 A | 11/1999 | Hiraike | |
| 6,012,071 A | 1/2000 | Krishna et al. | |
| 6,016,142 A | 1/2000 | Chang | |
| 6,031,549 A | 2/2000 | Hayes-Roth | |
| 6,044,205 A | 3/2000 | Reed et al. | |
| 6,065,008 A | 5/2000 | Simon et al. | |
| 6,073,147 A | 6/2000 | Chan et al. | |
| 6,111,654 A | 8/2000 | Cartier | |
| 6,141,002 A | 10/2000 | Kanungo et al. | |
| 6,167,441 A | 12/2000 | Himmel | |
| 6,249,908 B1 | 6/2001 | Stamm | |
| 6,252,671 B1 | 6/2001 | Peng et al. | |
| 6,282,327 B1 | 8/2001 | Betrisey | |
| 6,313,920 B1 | 11/2001 | Dresevic et al. | |
| 6,320,587 B1 | 11/2001 | Funyu | |
| 6,323,864 B1 | 11/2001 | Kaul et al. | |
| 6,330,577 B1 | 12/2001 | Kim | |
| 6,343,301 B1 | 1/2002 | Halt et al. | |
| 6,426,751 B1 | 7/2002 | Patel | |
| 6,490,051 B1 | 12/2002 | Nguyen et al. | |
| 6,512,531 B1 | 1/2003 | Gartland | |
| 6,522,330 B2 | 2/2003 | Kobayashi | |
| 6,522,347 B1 | 2/2003 | Tsuji | |
| 6,583,789 B1 | 6/2003 | Carlson et al. | |
| 6,601,009 B2 | 7/2003 | Florschuetz | |
| 6,657,625 B1 | 12/2003 | Chik et al. | |
| 6,675,358 B1 | 1/2004 | Kido | |
| 6,678,688 B1 | 1/2004 | Unruh | |
| 6,687,879 B1 | 2/2004 | Teshima | |
| 6,704,116 B1 | 3/2004 | Abulhab | |
| 6,704,648 B1 | 3/2004 | Naik et al. | |
| 6,718,519 B1 | 4/2004 | Taieb | |
| 6,738,526 B1 | 5/2004 | Betrisey | |
| 6,754,875 B1 | 6/2004 | Paradies | |
| 6,760,029 B1 | 7/2004 | Phinney et al. | |
| 6,771,267 B1 | 8/2004 | Muller | |
| 6,810,504 B2 | 10/2004 | Cooper et al. | |
| 6,813,747 B1 | 11/2004 | Taieb | |
| 6,853,980 B1 | 2/2005 | Ying et al. | |
| 6,856,317 B2 | 2/2005 | Konsella et al. | |
| 6,882,344 B1 | 4/2005 | Hayes et al. | |
| 6,901,427 B2 | 5/2005 | Teshima | |
| 6,907,444 B2 | 6/2005 | Narasimhan et al. | |
| 6,952,210 B1 | 10/2005 | Renner et al. | |
| 6,992,671 B1 | 1/2006 | Corona | |
| 6,993,538 B2 | 1/2006 | Gray | |
| 7,050,079 B1 | 5/2006 | Estrada et al. | |
| 7,064,757 B1 | 6/2006 | Opstad et al. | |
| 7,064,758 B2 | 6/2006 | Chik et al. | |
| 7,155,672 B1 | 12/2006 | Adler et al. | |
| 7,184,046 B1 | 2/2007 | Hawkins | |
| 7,188,313 B2 | 3/2007 | Hughes et al. | |
| 7,228,501 B2 | 6/2007 | Brown et al. | |
| 7,231,602 B1 | 6/2007 | Truelove et al. | |
| 7,346,845 B2 | 3/2008 | Teshima et al. | |
| 7,373,140 B1 | 5/2008 | Matsumoto | |
| 7,477,988 B2 | 1/2009 | Dorum | |
| 7,492,365 B2 | 2/2009 | Corbin et al. | |
| 7,505,040 B2 | 3/2009 | Stamm et al. | |
| 7,539,939 B1 | 5/2009 | Schomer | |
| 7,552,008 B2 | 6/2009 | Newstrom et al. | |
| 7,580,038 B2 | 8/2009 | Chik et al. | |
| 7,583,397 B2 | 9/2009 | Smith | |
| 7,636,885 B2 | 12/2009 | Merz et al. | |
| 7,701,458 B2 | 4/2010 | Sahuc et al. | |
| 7,735,020 B2 * | 6/2010 | Chaudhri | G06F 3/04847 |
| | | | 715/833 |
| 7,752,222 B1 | 7/2010 | Cierniak | |
| 7,768,513 B2 | 8/2010 | Klassen | |
| 7,836,094 B2 | 11/2010 | Ornstein et al. | |
| 7,882,432 B2 | 2/2011 | Nishikawa et al. | |
| 7,937,658 B1 | 5/2011 | Lunde | |
| 7,944,447 B2 | 5/2011 | Clegg et al. | |
| 7,958,448 B2 | 6/2011 | Fattic et al. | |
| 7,987,244 B1 | 7/2011 | Lewis et al. | |
| 8,098,250 B2 | 1/2012 | Clegg et al. | |
| 8,116,791 B2 | 2/2012 | Agiv | |
| 8,201,088 B2 | 6/2012 | Levantovsky et al. | |
| 8,201,093 B2 | 6/2012 | Tuli | |
| 8,306,356 B1 | 11/2012 | Bever | |
| 8,381,115 B2 | 2/2013 | Tranchant et al. | |
| 8,413,051 B2 | 4/2013 | Bacus et al. | |
| 8,464,318 B1 | 6/2013 | Hallak | |
| 8,601,374 B2 | 12/2013 | Parham | |
| 8,643,542 B2 | 2/2014 | Wendel | |
| 8,643,652 B2 | 2/2014 | Kaplan | |
| 8,644,810 B1 | 2/2014 | Boyle | |
| 8,689,101 B2 | 4/2014 | Fux et al. | |
| 8,707,208 B2 | 4/2014 | DiCamillo | |
| 8,731,905 B1 | 5/2014 | Tsang | |
| 9,063,682 B1 | 6/2015 | Bradshaw | |
| 9,317,777 B2 | 4/2016 | Kaasila et al. | |
| 9,319,444 B2 | 4/2016 | Levantovsky | |
| 9,432,671 B2 | 8/2016 | Campanelli et al. | |
| 9,449,126 B1 | 9/2016 | Genoni | |
| 9,483,445 B1 | 11/2016 | Joshi et al. | |
| 9,569,865 B2 | 2/2017 | Kaasila et al. | |
| 9,576,196 B1 | 2/2017 | Natarajan | |
| 9,626,337 B2 | 4/2017 | Kaasila et al. | |
| 9,691,169 B2 | 6/2017 | Kaasila et al. | |
| 9,805,288 B2 | 10/2017 | Kaasila et al. | |
| 9,817,615 B2 | 11/2017 | Seguin et al. | |
| 10,007,863 B1 | 6/2018 | Pereira et al. | |
| 10,032,072 B1 | 7/2018 | Tran | |
| 10,115,215 B2 | 10/2018 | Matteson et al. | |
| 10,140,261 B2 | 11/2018 | Yang | |
| 10,157,332 B1 | 12/2018 | Gray | |
| 10,733,529 B1 | 8/2020 | Tran et al. | |
| 10,867,241 B1 | 12/2020 | Rogers et al. | |
| 10,909,429 B2 | 2/2021 | Arilla et al. | |
| 11,334,750 B2 | 5/2022 | Arilla et al. | |
| 11,537,262 B1 | 12/2022 | Kaasila et al. | |
| 11,587,342 B2 | 2/2023 | Arilla et al. | |
| 11,657,602 B2 | 5/2023 | Kaasila et al. | |
| 2001/0021937 A1 * | 9/2001 | Cicchitelli | G09G 5/00 |
| | | | 715/205 |
| 2001/0052901 A1 | 12/2001 | Kawabata et al. | |
| 2002/0010725 A1 | 1/2002 | Mo | |
| 2002/0029232 A1 | 3/2002 | Bobrow et al. | |

(56) References Cited

U.S. PATENT DOCUMENTS

| | | |
|---|---|---|
| 2002/0033824 A1 | 3/2002 | Stamm |
| 2002/0052916 A1 | 5/2002 | Kloba et al. |
| 2002/0057853 A1 | 5/2002 | Usami |
| 2002/0059344 A1 | 5/2002 | Britton et al. |
| 2002/0087702 A1 | 7/2002 | Mori |
| 2002/0093506 A1 | 7/2002 | Hobson |
| 2002/0120721 A1 | 8/2002 | Eilers et al. |
| 2002/0122594 A1 | 9/2002 | Goldberg et al. |
| 2002/0174186 A1 | 11/2002 | Hashimoto et al. |
| 2002/0194261 A1 | 12/2002 | Teshima |
| 2003/0014545 A1 | 1/2003 | Broussard et al. |
| 2003/0076350 A1 | 4/2003 | Vu |
| 2003/0197698 A1 | 10/2003 | Perry et al. |
| 2004/0025118 A1 | 2/2004 | Renner |
| 2004/0088657 A1 | 5/2004 | Brown et al. |
| 2004/0119714 A1 | 6/2004 | Everett et al. |
| 2004/0177056 A1 | 9/2004 | Davis et al. |
| 2004/0183817 A1* | 9/2004 | Kaasila ............... G06F 16/9577 |
| | | 345/698 |
| 2004/0189643 A1 | 9/2004 | Frisken et al. |
| 2004/0207627 A1 | 10/2004 | Konsella et al. |
| 2004/0207658 A1* | 10/2004 | Awada .................... G06F 9/451 |
| | | 715/826 |
| 2004/0233198 A1 | 11/2004 | Kubo |
| 2005/0015307 A1 | 1/2005 | Simpson et al. |
| 2005/0033814 A1 | 2/2005 | Ota |
| 2005/0094173 A1 | 5/2005 | Engelman et al. |
| 2005/0111045 A1 | 5/2005 | Imai |
| 2005/0128508 A1 | 6/2005 | Greef et al. |
| 2005/0149942 A1 | 7/2005 | Venkatraman |
| 2005/0190186 A1 | 9/2005 | Klassen |
| 2005/0193336 A1 | 9/2005 | Fux et al. |
| 2005/0200871 A1 | 9/2005 | Miyata |
| 2005/0264570 A1 | 12/2005 | Stamm |
| 2005/0270553 A1 | 12/2005 | Kawara |
| 2005/0275656 A1 | 12/2005 | Corbin et al. |
| 2006/0010371 A1 | 1/2006 | Shur et al. |
| 2006/0017731 A1 | 1/2006 | Matskewich et al. |
| 2006/0061790 A1 | 3/2006 | Miura |
| 2006/0072136 A1 | 4/2006 | Hodder et al. |
| 2006/0072137 A1 | 4/2006 | Nishikawa et al. |
| 2006/0072162 A1 | 4/2006 | Nakamura |
| 2006/0103653 A1 | 5/2006 | Chik et al. |
| 2006/0103654 A1 | 5/2006 | Chik et al. |
| 2006/0132812 A1* | 6/2006 | Barnes .................. G06F 40/166 |
| | | 358/1.11 |
| 2006/0168639 A1 | 7/2006 | Gan |
| 2006/0241861 A1 | 10/2006 | Takashima |
| 2006/0245727 A1 | 11/2006 | Nakano et al. |
| 2006/0253395 A1 | 11/2006 | Corbell |
| 2006/0267986 A1 | 11/2006 | Bae et al. |
| 2006/0269137 A1 | 11/2006 | Evans |
| 2006/0285138 A1 | 12/2006 | Merz et al. |
| 2007/0002016 A1 | 1/2007 | Cho et al. |
| 2007/0006076 A1 | 1/2007 | Cheng |
| 2007/0008309 A1 | 1/2007 | Sahuc et al. |
| 2007/0024626 A1 | 2/2007 | Kagle et al. |
| 2007/0050419 A1 | 3/2007 | Weyl et al. |
| 2007/0055931 A1 | 3/2007 | Zaima |
| 2007/0139412 A1 | 6/2007 | Stamm |
| 2007/0139413 A1 | 6/2007 | Stamm et al. |
| 2007/0159646 A1 | 7/2007 | Adelberg et al. |
| 2007/0172199 A1 | 7/2007 | Kobayashi |
| 2007/0211062 A1 | 9/2007 | Engelman et al. |
| 2007/0283047 A1 | 12/2007 | Theis et al. |
| 2008/0028304 A1 | 1/2008 | Levantovsky et al. |
| 2008/0030502 A1 | 2/2008 | Chapman |
| 2008/0115046 A1 | 5/2008 | Yamaguchi |
| 2008/0118151 A1 | 5/2008 | Bouguet et al. |
| 2008/0154911 A1 | 6/2008 | Cheng |
| 2008/0222734 A1 | 9/2008 | Redlich et al. |
| 2008/0243837 A1 | 10/2008 | Davis |
| 2008/0282186 A1 | 11/2008 | Basavaraju |
| 2008/0303822 A1 | 12/2008 | Taylor |
| 2008/0306916 A1 | 12/2008 | Gonzalez et al. |
| 2009/0031220 A1 | 1/2009 | Tranchant |
| 2009/0037492 A1 | 2/2009 | Baitalmal et al. |
| 2009/0037523 A1 | 2/2009 | Kolke et al. |
| 2009/0063964 A1 | 3/2009 | Huang |
| 2009/0070128 A1 | 3/2009 | McCauley et al. |
| 2009/0097049 A1 | 4/2009 | Cho |
| 2009/0100074 A1 | 4/2009 | Joung et al. |
| 2009/0119678 A1 | 5/2009 | Shih |
| 2009/0158134 A1 | 6/2009 | Wang |
| 2009/0171766 A1 | 7/2009 | Schiff et al. |
| 2009/0183069 A1 | 7/2009 | Duggan et al. |
| 2009/0275351 A1 | 11/2009 | Jeung et al. |
| 2009/0287998 A1 | 11/2009 | Kalra |
| 2009/0290813 A1 | 11/2009 | He |
| 2009/0303241 A1 | 12/2009 | Priyadarshi et al. |
| 2009/0307585 A1 | 12/2009 | Tranchant et al. |
| 2010/0014104 A1 | 1/2010 | Soord |
| 2010/0066763 A1 | 3/2010 | MacDougall |
| 2010/0088606 A1 | 4/2010 | Kanno |
| 2010/0088694 A1 | 4/2010 | Peng |
| 2010/0091024 A1 | 4/2010 | Myadam |
| 2010/0115454 A1 | 5/2010 | Tuli |
| 2010/0164984 A1 | 7/2010 | Rane |
| 2010/0218086 A1 | 8/2010 | Howell et al. |
| 2010/0231598 A1 | 9/2010 | Hernandez et al. |
| 2010/0275161 A1 | 10/2010 | DiCamillo |
| 2010/0321393 A1 | 12/2010 | Levantovsky |
| 2011/0029103 A1 | 2/2011 | Mann et al. |
| 2011/0032074 A1 | 2/2011 | Novack et al. |
| 2011/0090229 A1 | 4/2011 | Bacus et al. |
| 2011/0090230 A1 | 4/2011 | Bacus et al. |
| 2011/0093565 A1 | 4/2011 | Bacus et al. |
| 2011/0115797 A1 | 5/2011 | Kaplan |
| 2011/0131153 A1 | 6/2011 | Grim, III |
| 2011/0188761 A1 | 8/2011 | Boutros et al. |
| 2011/0203000 A1 | 8/2011 | Bacus et al. |
| 2011/0238495 A1 | 9/2011 | Kang |
| 2011/0258535 A1 | 10/2011 | Adler, III et al. |
| 2011/0271180 A1 | 11/2011 | Lee |
| 2011/0276872 A1 | 11/2011 | Kataria |
| 2011/0289407 A1 | 11/2011 | Naik |
| 2011/0310432 A1 | 12/2011 | Waki |
| 2012/0001922 A1 | 1/2012 | Escher et al. |
| 2012/0016964 A1 | 1/2012 | Veen et al. |
| 2012/0033874 A1* | 2/2012 | Perronnin ............ G06V 30/245 |
| | | 382/187 |
| 2012/0066590 A1 | 3/2012 | Harris et al. |
| 2012/0072978 A1 | 3/2012 | DeLuca et al. |
| 2012/0092345 A1 | 4/2012 | Joshi et al. |
| 2012/0102176 A1 | 4/2012 | Lee et al. |
| 2012/0102391 A1 | 4/2012 | Lee et al. |
| 2012/0127069 A1 | 5/2012 | Santhiveeran et al. |
| 2012/0134590 A1 | 5/2012 | Petrou |
| 2012/0215640 A1 | 8/2012 | Ramer et al. |
| 2012/0269425 A1 | 10/2012 | Marchesotti |
| 2012/0269441 A1 | 10/2012 | Marchesotti et al. |
| 2012/0288190 A1 | 11/2012 | Tang |
| 2012/0306852 A1 | 12/2012 | Taylor |
| 2012/0307263 A1 | 12/2012 | Ichikawa et al. |
| 2012/0323694 A1 | 12/2012 | Lita et al. |
| 2012/0323971 A1 | 12/2012 | Pasupuleti |
| 2013/0033498 A1 | 2/2013 | Linnerud et al. |
| 2013/0067319 A1 | 3/2013 | Olszewski et al. |
| 2013/0120396 A1 | 5/2013 | Kaplan |
| 2013/0127872 A1 | 5/2013 | Kaplan |
| 2013/0156302 A1 | 6/2013 | Rodriguez Serrano et al. |
| 2013/0163027 A1 | 6/2013 | Shustef |
| 2013/0179761 A1 | 7/2013 | Cho |
| 2013/0185028 A1 | 7/2013 | Sullivan |
| 2013/0215126 A1 | 8/2013 | Roberts |
| 2013/0215133 A1 | 8/2013 | Gould et al. |
| 2013/0321617 A1 | 12/2013 | Lehmann |
| 2013/0326348 A1 | 12/2013 | Ip et al. |
| 2014/0025756 A1 | 1/2014 | Kamens |
| 2014/0047329 A1 | 2/2014 | Levantovsky et al. |
| 2014/0052801 A1 | 2/2014 | Zuo et al. |
| 2014/0059054 A1 | 2/2014 | Liu et al. |
| 2014/0089348 A1 | 3/2014 | Vollmert |
| 2014/0136957 A1 | 5/2014 | Kaasila et al. |

(56) References Cited

U.S. PATENT DOCUMENTS

| | | |
|---|---|---|
| 2014/0153012 A1 | 6/2014 | Seguin |
| 2014/0176563 A1 | 6/2014 | Kaasila et al. |
| 2014/0195903 A1 | 7/2014 | Kaasila et al. |
| 2014/0279039 A1 | 9/2014 | Systrom et al. |
| 2014/0282055 A1 | 9/2014 | Engel et al. |
| 2014/0358802 A1 | 12/2014 | Biswas |
| 2015/0020212 A1 | 1/2015 | Demaree |
| 2015/0030238 A1 | 1/2015 | Yang et al. |
| 2015/0036919 A1 | 2/2015 | Bourdev et al. |
| 2015/0055855 A1 | 2/2015 | Rodriguez et al. |
| 2015/0062140 A1 | 3/2015 | Levantovsky et al. |
| 2015/0063713 A1* | 3/2015 | Yang .................... G06V 30/245 |
| | | 382/228 |
| 2015/0074522 A1 | 3/2015 | Harned, III et al. |
| 2015/0097842 A1 | 4/2015 | Kaasila et al. |
| 2015/0100882 A1 | 4/2015 | Severenuk |
| 2015/0146020 A1 | 5/2015 | Imaizumi et al. |
| 2015/0154002 A1 | 6/2015 | Weinstein et al. |
| 2015/0178476 A1 | 6/2015 | Horton |
| 2015/0193386 A1 | 7/2015 | Wurtz |
| 2015/0220494 A1 | 8/2015 | Qin et al. |
| 2015/0278167 A1 | 10/2015 | Arnold et al. |
| 2015/0339273 A1 | 11/2015 | Yang et al. |
| 2015/0339276 A1 | 11/2015 | Bloem et al. |
| 2015/0339543 A1 | 11/2015 | Campanelli et al. |
| 2015/0348297 A1 | 12/2015 | Kaasila et al. |
| 2016/0078656 A1 | 3/2016 | Borson et al. |
| 2016/0092439 A1 | 3/2016 | Ichimi |
| 2016/0140952 A1 | 5/2016 | Graham |
| 2016/0170940 A1 | 6/2016 | Levantovsky |
| 2016/0171343 A1 | 6/2016 | Kaasila et al. |
| 2016/0182606 A1 | 6/2016 | Kaasila et al. |
| 2016/0246762 A1 | 8/2016 | Eaton |
| 2016/0307156 A1 | 10/2016 | Burner |
| 2016/0307347 A1* | 10/2016 | Matteson ................ G06F 18/22 |
| 2016/0314377 A1 | 10/2016 | Vieira et al. |
| 2016/0321217 A1 | 11/2016 | Ikemoto et al. |
| 2016/0344828 A1 | 11/2016 | Hausler et al. |
| 2016/0350336 A1 | 12/2016 | Checka |
| 2016/0371232 A1 | 12/2016 | Ellis et al. |
| 2017/0011279 A1 | 1/2017 | Soldevila et al. |
| 2017/0017778 A1 | 1/2017 | Ford et al. |
| 2017/0024641 A1 | 1/2017 | Wierzynski |
| 2017/0039445 A1 | 2/2017 | Tredoux et al. |
| 2017/0098138 A1 | 4/2017 | Wang et al. |
| 2017/0098140 A1 | 4/2017 | Wang et al. |
| 2017/0124503 A1 | 5/2017 | Bastide |
| 2017/0237723 A1 | 8/2017 | Gupta et al. |
| 2017/0357877 A1 | 12/2017 | Lin |
| 2018/0039605 A1 | 2/2018 | Pao et al. |
| 2018/0075455 A1 | 3/2018 | Kumnick et al. |
| 2018/0082156 A1 | 3/2018 | Jin et al. |
| 2018/0097763 A1 | 4/2018 | Garcia et al. |
| 2018/0109368 A1 | 4/2018 | Johnson et al. |
| 2018/0144256 A1 | 5/2018 | Saxena et al. |
| 2018/0165554 A1 | 6/2018 | Zhang |
| 2018/0203851 A1 | 7/2018 | Wu et al. |
| 2018/0253988 A1 | 9/2018 | Kanayama et al. |
| 2018/0285696 A1 | 10/2018 | Eigen et al. |
| 2018/0285965 A1 | 10/2018 | Kaasila et al. |
| 2018/0300592 A1 | 10/2018 | Jin et al. |
| 2018/0332140 A1 | 11/2018 | Bullock |
| 2018/0341907 A1 | 11/2018 | Tucker et al. |
| 2018/0349527 A1 | 12/2018 | Li et al. |
| 2018/0373921 A1 | 12/2018 | Di Carlo |
| 2019/0019087 A1 | 1/2019 | Fukui |
| 2019/0073537 A1 | 3/2019 | Arilla et al. |
| 2019/0095763 A1 | 3/2019 | Arilla et al. |
| 2019/0130232 A1 | 5/2019 | Kaasila et al. |
| 2019/0156193 A1 | 5/2019 | Jaroch |
| 2020/0219274 A1 | 7/2020 | Afridi et al. |
| 2021/0350190 A1 | 11/2021 | Arilla et al. |

FOREIGN PATENT DOCUMENTS

| | | |
|---|---|---|
| EP | 2857983 | 4/2015 |
| JP | 06-258982 | 9/1994 |
| JP | H10-124030 | 5/1998 |
| JP | 2002-507289 | 3/2002 |
| JP | 2003-288184 | 10/2003 |
| JP | 05-215915 | 8/2005 |
| JP | 05-217816 | 8/2005 |
| JP | 2007-011733 | 1/2007 |
| JP | 2009-545064 | 12/2009 |
| JP | 5140997 | 11/2012 |
| TW | 544595 | 8/2003 |
| TW | 2005/11041 | 3/2005 |
| WO | WO 94/23379 | 10/1994 |
| WO | WO 99/00747 | 1/1999 |
| WO | WO 01/91088 | 11/2001 |
| WO | WO 03/023614 | 3/2003 |
| WO | WO 04/012099 | 2/2004 |
| WO | WO 05/001675 | 1/2005 |
| WO | WO 2008/013720 | 1/2008 |

OTHER PUBLICATIONS

"Announcing Speakeasy: A new open-source language tool from Typekit," Oct. 28, 2010, on-line http://blog.typekit.com/2010/10/28/announcing-speakeasy-a-new-open-source-language-tool-from-typekit/.

"colorfont/v1," Feb. 28, 2011, retrieved from the internet: http://manufacturaindependente.com/colorfont/v1/.

"Flash CS4 Professional ActionScript 2.0", 2007, retrieved on http://help.adobe.com/en_US/AS2LCR/Flash_10.0/help.html?content=00000284.html on Aug. 31, 2015.

"photofont.com—Use photofonts," Sep. 2, 2012, retrieved from the internet: http://web.archive.org/web/20120902021143/http://photofont.com/photofont/use/web.

"Saffron Type System", retrieved from the internet Nov. 12, 2014, 7 pages.

Adobe Systems Incorporated, "PostScript Language Reference—Third Edition," Feb. 1999, pp. 313-390.

Adobe Systems Incorporated, "The Type 42 Font Format Specification," Technical Note #5012, Jul. 31, 1998, pp. 1-24.

Adobe Systems Incorporated, "To Unicode Mapping File Tutorial," Adobe Technical Note, XP002348387, May 2003.

Apple Computers, "The True Type Font File," Oct. 27, 2000, pp. 1-17.

Celik et al., "W3C, CSS3 Module: Fonts," W3C Working Draft, Jul. 31, 2001, pp. 1-30.

Chen et al., "Detecting and reading text in natural scenes," Proceedings of the 2004 IEEE Computer Society Conference Vision and Pattern Recognition; Publication [online]. 2004 [retrieved Dec. 16, 2018]. Retrieved from the Internet: <URL:http://citeseerx.ist.psu.edu/viewdoc/download?doi=10.1.1.334.2715&rep=rep1&type=pdf>; pp. 1-8.

Doughty, Mike, "Using OpenType® Fonts with Adobe® InDesign®," Jun. 11, 2012 retrieved from the internet: http://webarchive.org/web/20121223032924/http://www.sketchpad.net/opentype-indesign.htm (retrieved Sep. 22, 2014), 2 pages.

European Search Report in European Application No. 18193233.6, dated Nov. 11, 2018, 8 pages.

European Search Report in European Application No. 18197313.2, dated Nov. 30, 2018, 7 pages.

European Search Report, 13179728.4, Sep. 10, 2015, 3 pages.

European Search Report, 14184499.3, Jul. 13, 2015, 7 pages.

European Search Report, 14187549.2, Jul. 30, 2015, 7 pages.

Extensis, Suitcase 10.2, Quick Start Guide for Macintosh, 2001, 23 pgs.

Font Pair, [online]. "Font Pair", Jan. 20, 2015, Retrieved from URL: http://web.archive.org/web/20150120231122/http://fontpair.co/, 31 pages.

Forums.macrumors.com' [online]. "which one is the main FONTS folder ?" May 19, 2006, [retrieved on Jun. 19, 2017]. Retrieved from

(56)                    References Cited

OTHER PUBLICATIONS the Internet: URL<https://forums.macrumors.com/threads/which-one- is-the-main-fontsfolder.202284/>, 7 pages.
George Margulis, "Optical Character Recognition: Classification of Handwritten Digits and Computer Fonts", Aug. 1, 2014, URL: https://web.archive.org/web/20140801114017/http://cs229.stanford.edu/proj2011/Margulis-OpticalCharacterRecognition.pdf.
Goswami, Gautum, "Quite 'Writly' Said!," One Brick at a Time, Aug. 21, 2006, Retrieved from the internet: :http://gautamg.wordpress.com/2006/08/21/quj.te-writely-said/ (retrieved on Sep. 23, 2013), 3 pages.
International Preliminary Report on Patentability issued in PCT application No. PCT/US2013/071519 dated Jun. 9, 2015, 8 pages.
International Preliminary Report on Patentability issued in PCT application No. PCT/US2015/066145 dated Jun. 20, 2017, 7 pages.
International Preliminary Report on Patentability issued in PCT application No. PCT/US2016/023282, dated Oct. 26, 2017, 9 pages.
International Search Report & Written Opinion in International Application No. PCT/US18/58191, dated Feb. 19, 2019, 17 pages.
International Search Report & Written Opinion issued in PCT application No. PCT/US10/01272, mailed Jun. 15, 2010, 6 pages.
International Search Report & Written Opinion issued in PCT application No. PCT/US2011/034050 dated Jul. 15, 2011, 13 pages.
International Search Report & Written Opinion, PCT/US2013/026051, mailed Jun. 5, 2013, 9 pages.
International Search Report & Written Opinion, PCT/US2013/071519, mailed Mar. 5, 2014, 12 pages.
International Search Report & Written Opinion, PCT/US2013/076917, mailed Jul. 9, 2014, 11 pages.
International Search Report & Written Opinion, PCT/US2014/010786, mailed Sep. 30, 2014, 9 pages.
International Search Report & Written Opinion, PCT/US2016/023282, mailed Oct. 7, 2016, 16 pages.
Japanese Office Action, 2009-521768, mailed Aug. 28, 2012.
Japanese Office Action, 2013-508184, mailed Apr. 1, 2015.
Koren et al., "Visualization of labeled data using linear transformations." IEEE Symposium on Information Visualization, 2003 (IEEE Cat. No. 03TH8714).
Liu, "Visual Exploration and Comparative Analytics of Multidimensional Data Sets", Graduate Program in Computer Science and Engineering, The Ohio State University, 2016, 210 pages.
Ma Wei-Ying et al., "Framework for adaptive content delivery in heterogeneous network environments", Jan. 24, 2000, Retrieved from the Internet: http://www.cooltown.hp.com/papers/adcon/MMCN2000.
O'Donovan et al., "Exploratory Font Selection Using Crowdsourced Attributes," ACT TOG, Jul. 2014, 33(4): 9 pages.

Open Text Exceed, User's Guide, Version 14, Nov. 2009, 372 pgs.
Rannanathan et al. "A Novel Technique for English Font Recognition Using Support Vector Machines," 2009 International Conference on Advances in Recent Technologies in Communication and Computing, 2009, pp. 766-769.
Rannanathan et al., "Tamil Font Recognition Using Gabor Filters and Support Vector Machines," 2009 International Conference on Advances in Computing, Control, and Telecommunication Technologies, 2009, pp. 613-615.
Saurabh, Kataria et al., "Font retrieval on a large scale: An experimental study", 2010 17th IEEE International Conference on Image Processing (ICIP 2010); Sep. 26-29, 2010; Hong Kong, China, IEEE, Piscataway, NJ, USA, Sep. 26, 2010, pp. 2177-2180.
Shusen, et al. "Distortion-Guided Structure-Driven Interactive Exploration of High-Dimensional Data," Computer Graphics Forum., 2014, 33(3):101-110.
Supplementary European Search Report, European Patent Office, European patent application No. EP 07796924, dated Dec. 27, 2010, 8 pages.
TrueType Fundamentals, Microsoft Typography, Nov. 1997, pp. 1-17.
Typeconnection, [online]. "typeconnection", Feb. 26, 2015, Retrieved from URL: http://web.archive.org/web/20150226074717/http://www.typeconnection.com/stepl.php, 4 pages.
Universal Type Server, Upgrading from Suitcase Server, Sep. 29, 2009, 18 pgs.
Wenzel, Martin, "An Introduction to OpenType Substitution Features," Dec. 26, 2012, Retrieved from the internet: http://web.archive.org/web/20121226233317/http://ilovetypography.com/OpenType/opentype-features. Html (retrieved on Sep. 18, 2014), 12 pages.
Wikipedia.com [online], "Feature selection," Wikipedia, Sep. 19, 2017, retrieved on Oct. 19, 2021, retrieved from URL<https://en.wikipedia.org/w/index.php?title=Feature selection&oldid=801416585>, 15 pages.
Written Opposition to the grant of Japanese Patent No. 6097214 by Masatake Fujii, dated Sep. 12, 2017, 97 pages, with partial English translation.
Wu et al., "Stochastic neighbor projection on manifold for feature extraction." Neuroconnputing, 2011,74(17):780-2789.
Www.dgp.toronto.edu [online], "Supplemental Material: Exploratory Font Selection Using Crowdsourced Attributes," available on or before May 12, 2014, via Internet Archive: Wayback Machine URL <https://web.archive.org/web/20140512101752/http://www.dgp.toronto.edu/~donovan/font/supplemen tal.pdf>, retrieved on Jun. 28, 2021, URL<http://www.dgp.toronto.edu/~donovan/font/supplemental.pdf>, 9 pages.

* cited by examiner

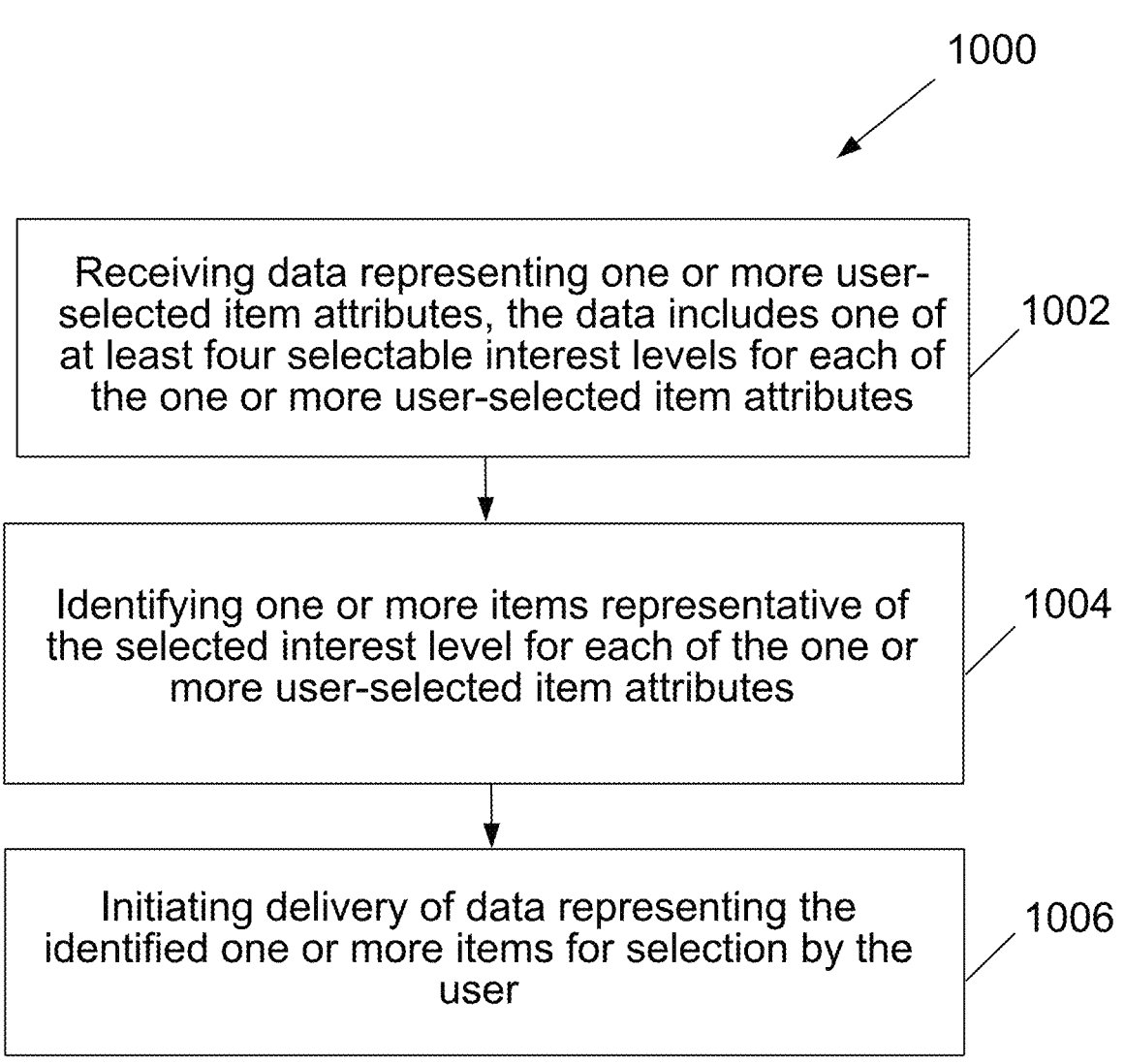

1000

Receiving data representing one or more user-selected item attributes, the data includes one of at least four selectable interest levels for each of the one or more user-selected item attributes          1002

Identifying one or more items representative of the selected interest level for each of the one or more user-selected item attributes          1004

Initiating delivery of data representing the identified one or more items for selection by the user          1006

FIG. 10

USING ATTRIBUTES FOR FONT RECOMMENDATIONS

CLAIM OF PRIORITY

This application claims priority under 35 USC § 120 to U.S. patent application Ser. No. 15/215,248, filed on Jul. 20, 2016, now U.S. Pat. No. 11,537,262, which claims priority under 35 USC § 119 (e) to U.S. Patent Application Ser. No. 62/195,165, filed on Jul. 21, 2015 the entire contents of which are hereby incorporated by reference.

BACKGROUND

This description relates to improving font selection efficiency by providing selectable attributes of fonts to a user. Upon selection of one or more attributes, fonts are identified and presented that reflect the selections.

Proportional to the astronomical growth of available text content, for example via the Internet, the demand to express such content has grown. Similar to the variety of products provided by online stores; content authors, publishers, graphic designers, etc. have grown accustomed to having a vast variety of fonts to present text. However, this virtual explosion in the sheer number of usable fonts can become overwhelming and can easily saturate an individual attempting to find and select a font to present textual content. Faced with such an overabundance of information, decision-making abilities can be hampered causing the individual to become frustrated.

SUMMARY

The systems and techniques described can aid individuals such as designers (e.g., website designers) by efficiently recommending fonts that reflect particular attributes (e.g., happiness, trustworthiness, etc.) identified by the designer. Rather than a simply binary indication of using a font attribute or not (e.g., font should include happiness or font should not include happiness), the designer provides a level of interest for each selected attribute. For example, happiness may be reflected in the recommended fonts or strongly reflected in the recommended fonts. By allowing a designer to select which attributes should be reflected in recommended fonts and interest level (in each selected attribute), the designer can have a desired topic (e.g., emotion) conveyed in font recommendations and not have to laboriously scan through hundreds if not thousands of fonts which may or may not be relevant to the design task at hand. Further, by efficiently providing a list of highly relevant font recommendations, a designer may select and license multiple fonts rather than just one reasonable font selected from a multitude of irrelevant fonts.

In one aspect, a computing device implemented method includes receiving data representing one or more user-selected item attributes. The data includes one of at least four selectable interest levels for each of the one or more user-selected item attributes. The method also includes identifying one or more items representative of the selected interest level for each of the one or more user-selected item attributes, initiating delivery of data representing the identified one or more items for user selection.

Implementations may include one or more of the following features. The item may be a font. Two of the at least four selectable interest levels may represent interest in having the item attribute reflected in the one or more identified items. Two of the at least four selectable interest levels may represent interest in the item attribute being absent in the one or more identified items. Identifying the one or more items representative of the selected interest level for each of the user-selected items attributes may employ a deep learning machine. One or more biased survey questions may be used to train the deep learning machine. Identifying the one or more items representative of the selected interest level for each of the user-selected item attributes may employ an ensemble of deep learning machines. The ensemble of deep learning machines may be trained using data that represents a listing of items for each of the user-selected attributes, wherein the data that represents the item listing is weighted. The data that represents the item listing may be weighted by a biquadratic curve. Data that represents fonts located at the start and end of the item listing may be similarly weighted. Identifying the one or more item representative of the selected interest level for each of the user-selected item attributes may include multiplying a numerical value representing an attribute's presence in an item and a numerical value representing the selected interest level for the attribute. At least one of the item attributes is identified from survey data for being user-selectable.

In another aspect, a system includes a computing device that includes a memory configured to store instructions. The computing device also includes a processor to execute the instructions to perform operations that include receiving data representing one or more user-selected item attributes. The data includes one of at least four selectable interest levels for each of the one or more user-selected item attributes. Operations also include identifying one or more items representative of the selected interest level for each of the one or more user-selected item attributes, and initiating delivery of data representing the identified one or more items for user selection.

Implementations may include one or more of the following features. The item may be a font. Two of the at least four selectable interest levels may represent interest in having the item attribute reflected in the one or more identified items. Two of the at least four selectable interest levels may represent interest in the item attribute being absent in the one or more identified items. Identifying the one or more items representative of the selected interest level for each of the user-selected items attributes may employ a deep learning machine. One or more biased survey questions may be used to train the deep learning machine. Identifying the one or more items representative of the selected interest level for each of the user-selected item attributes may employ an ensemble of deep learning machines. The ensemble of deep learning machines may be trained using data that represents a listing of items for each of the user-selected attributes, wherein the data that represents the item listing is weighted. The data that represents the item listing may be weighted by a biquadratic curve. Data that represents fonts located at the start and end of the item listing may be similarly weighted. Identifying the one or more item representative of the selected interest level for each of the user-selected item attributes may include multiplying a numerical value representing an attribute's presence in an item and a numerical value representing the selected interest level for the attribute. At least one of the item attributes is identified from survey data for being user-selectable.

In still another aspect, one or more computer readable media storing instructions that are executable by a processing device, and upon such execution cause the processing device to perform operations that include receiving data representing one or more user-selected item attributes. The data includes one of at least four selectable interest levels for each of the one or more user-selected item attributes. Operations also include identifying one or more items representative of the selected interest level for each of the one or more user-selected item attributes, and initiating delivery of data representing the identified one or more items for user selection.

Implementations may include one or more of the following features. The item may be a font. Two of the at least four selectable interest levels may represent interest in having the item attribute reflected in the one or more identified items. Two of the at least four selectable interest levels may represent interest in the item attribute being absent in the one or more identified items. Identifying the one or more items representative of the selected interest level for each of the user-selected items attributes may employ a deep learning machine. One or more biased survey questions may be used to train the deep learning machine. Identifying the one or more items representative of the selected interest level for each of the user-selected item attributes may employ an ensemble of deep learning machines. The ensemble of deep learning machines may be trained using data that represents a listing of items for each of the user-selected attributes, wherein the data that represents the item listing is weighted. The data that represents the item listing may be weighted by a biquadratic curve. Data that represents fonts located at the start and end of the item listing may be similarly weighted. Identifying the one or more item representative of the selected interest level for each of the user-selected item attributes may include multiplying a numerical value representing an attribute's presence in an item and a numerical value representing the selected interest level for the attribute. At least one of the item attributes is identified from survey data for being user-selectable.

These and other aspects, features, and various combinations may be expressed as methods, apparatus, systems, means for performing functions, program products, etc.

Other features and advantages will be apparent from the description and the claims.

DESCRIPTION OF DRAWINGS

FIG. 10 is a flowchart of operations for identifying font recommendations from user-selected font attributes and levels of interest.

DETAILED DESCRIPTION

Figure 1:
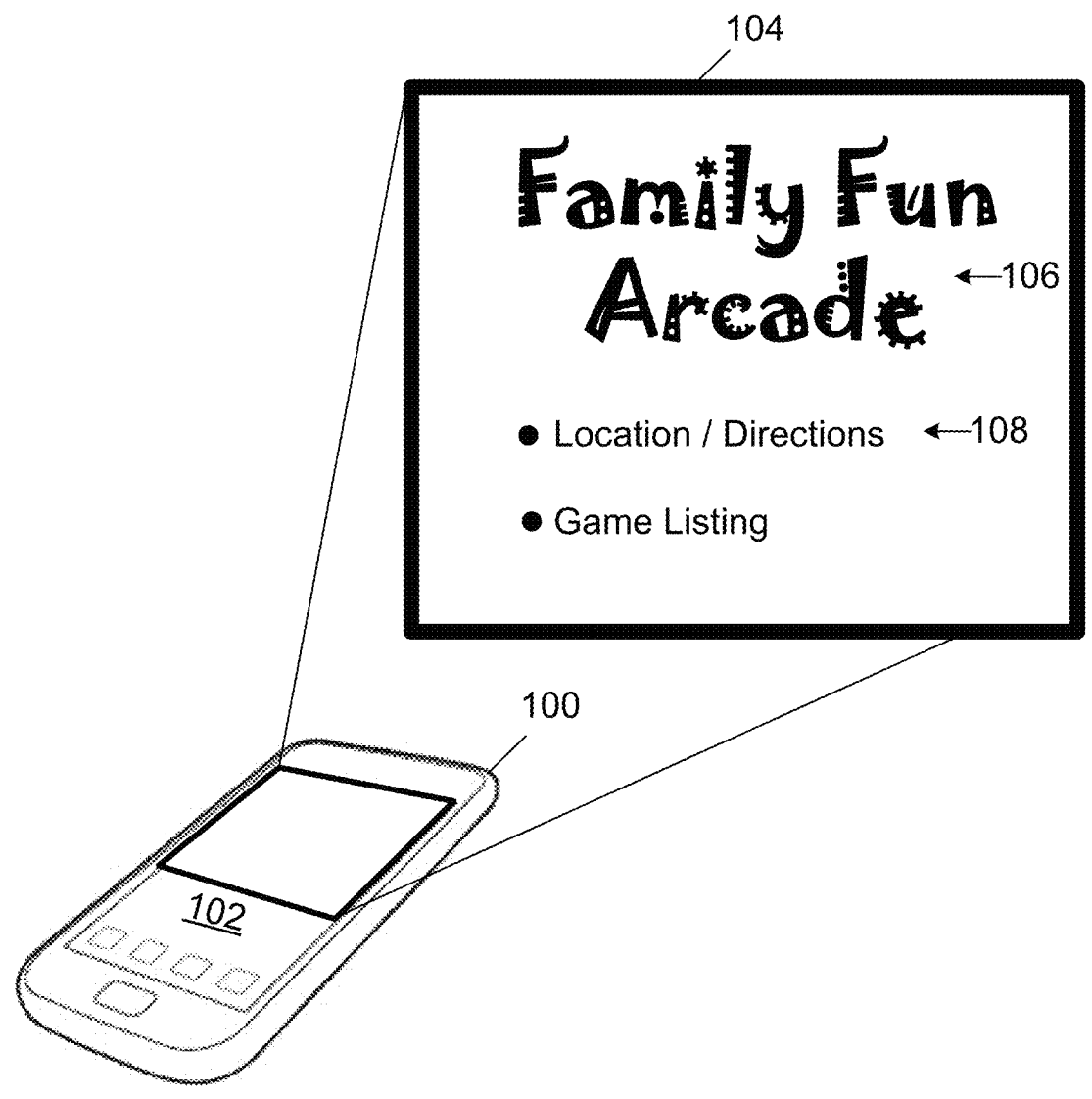
FIG. 1 illustrates a smartphone presenting textual content in multiple fonts.

Referring to FIG. 1 a computing device (e.g., a mobile smartphone 100) includes a display 102 that allows user to view (and in some cases create, edit, etc.) various types of content such as text, via one more applications. Along with presenting different content from a variety of sources (e.g., Internet sites), browsers and other types of applications (e.g., word processors) may use different types of fonts to present a desired effect. For example, web assets (e.g., web pages, web sites, web based advertisements, etc.) may be developed that use particular fonts to quickly catch the attention of a viewer. With an ever-increasing number of fonts at a designer's disposal (e.g., for web asset development, adjusting presented text, etc.), selecting an appropriate font for the project at hand could turn into be a noticeably time-consuming task. To reduce such a potential time sink, one or more techniques may be implemented to recommend available fonts (e.g., for purchase, license, etc.) to a designer. A list of font attributes can be presented to allow a web asset designer to select one or more of the attributes as a basis for identifying font recommendations. From the recommendations, the user could select one or more fonts for use in his or her development effort. In the illustrated example, a portion 104 of the display 102 presents a web page for an establishment (e.g., an arcade). The name of the arcade 106 is presented in a font that has attributes that could be considered as emotionally uplifting and project a positive connotation (e.g., for attracting arcade goers). Just as this font may suggest favorable feelings, other types of fonts may induce other feelings such as a negative, neutral or other emotions (e.g., a relatively neutral font other information 108 on another page portion). To present the displayed text, the designer may have consciously selected the font 106 to invoke such an emotion from the viewer. Selecting a font to achieve such an end result could take a considerable amount of time based on the number of potential candidate fonts (e.g. thousands of fonts). Rather than laboriously searching for this font, the designer could select a representative attribute (from a list of attributes) to trigger a process of recommending fonts that reflect the selected attribute. For example, by selecting an attribute associated with happiness, the font 106 can be identified and presented to the user as a recommendation (along with other fonts that convey happiness). Additionally, by presenting such a collection of selectable fonts that share the same attribute or attributes (e.g., happiness), the probability increases that the designer may license, purchase, etc. more fonts than originally planned, thereby potentially assisting the designer with other portions of this development and/or other developments and increase sales for a font provider.

Figure 2:
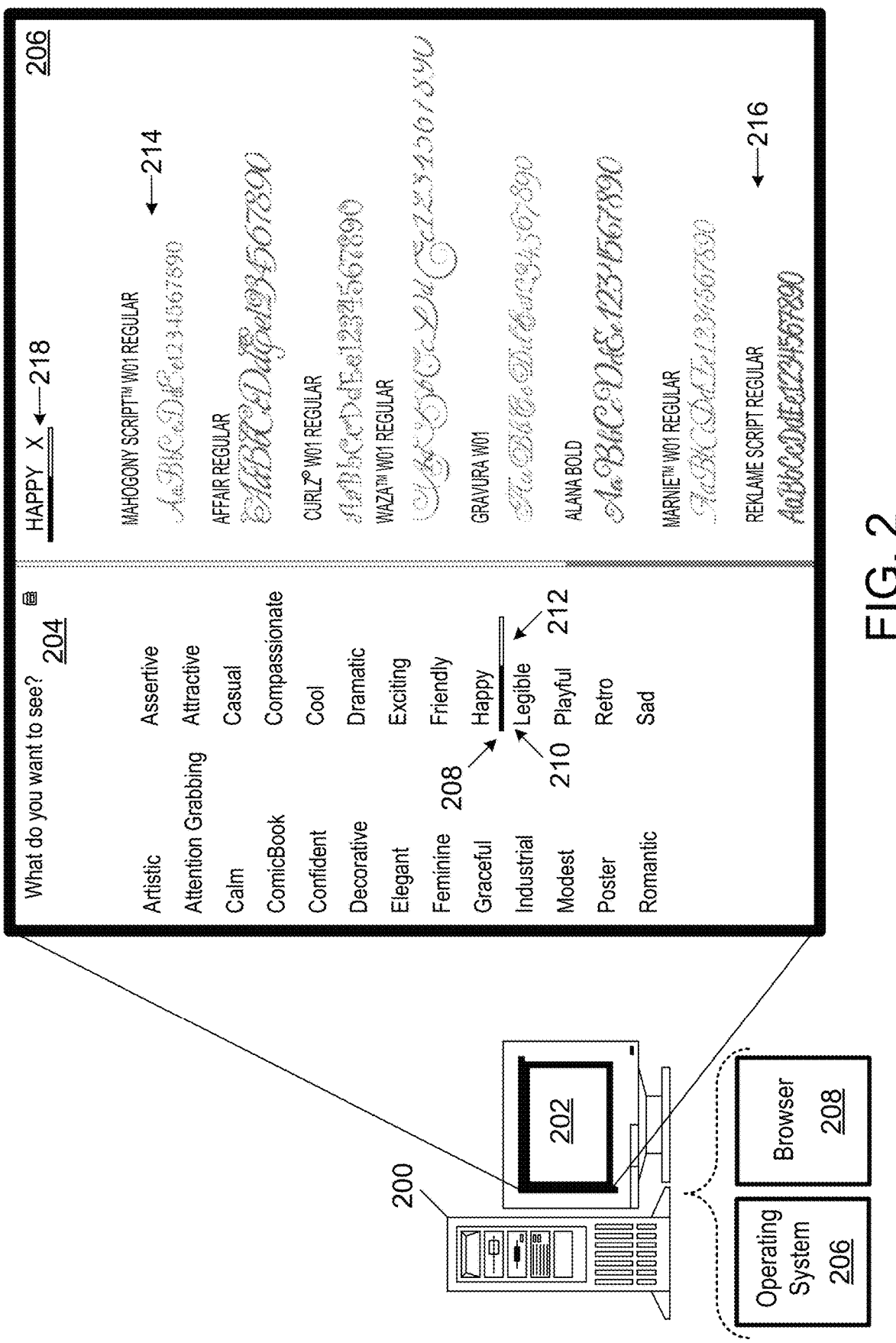
FIGS. 2-5 illustrates an interface that presents font recommendations based upon user-selected font attributes and levels of interest.

Referring to FIG. 2, a computer system 200 used for asset development is shown that includes a display 202 presenting a split screen that includes a menu of user-selectable font attributes 204 and a panel 206 that lists font recommendations based on upon the selected attribute (or attributes). To present this information in this example, the computer system 200 includes an operating system 206 and executes a browser 208 that exchanges information with a variety of data sources (e.g., a font provider from which the content of the menu 204 and panel 206 originates). In this example, the menu 204 includes a list of thirty-one attributes (e.g., artistic, happy, sad, etc.) that are selectable by a user by using a pointing device (e.g., a mouse driven pointer positioned over an attribute and selected). In some situations, a single attribute (e.g., "Happy") may be selected to indicate the type of fonts being sought; however, the user can also select multiple attributes (e.g., "Happy" and "Legible"). In general, each of the attributes included in a menu 204 can be considered as a quality that can be graphically represented in one or more fonts. In this particular example, the attribute labeled "Happy" is selected and a horizontal bar 208 is presented to graphically indicate the selection (along with highlighting the text label of the attribute).

Along with selecting an attribute, a level of interest in the particular attribute may also be selected by the user by interacting with the menu 204. For example, by selecting the attribute once (with the pointing device), a first level of interest is selected (as indicated with a left portion 210 of the bar 208). By selecting the first level of interest, in this example fonts that somewhat reflect the corresponding attribute ("Happy") are identified. This first level of interest indicates that candidate fonts can convey a weaker representation of the attribute compared to a second level of interest that would strongly reflect the attribute. In this example, only the first level of interest is selected and the second level has not been selected, as indicated by a non-highlighted right portion 212 of the bar 208.

Figure 3:
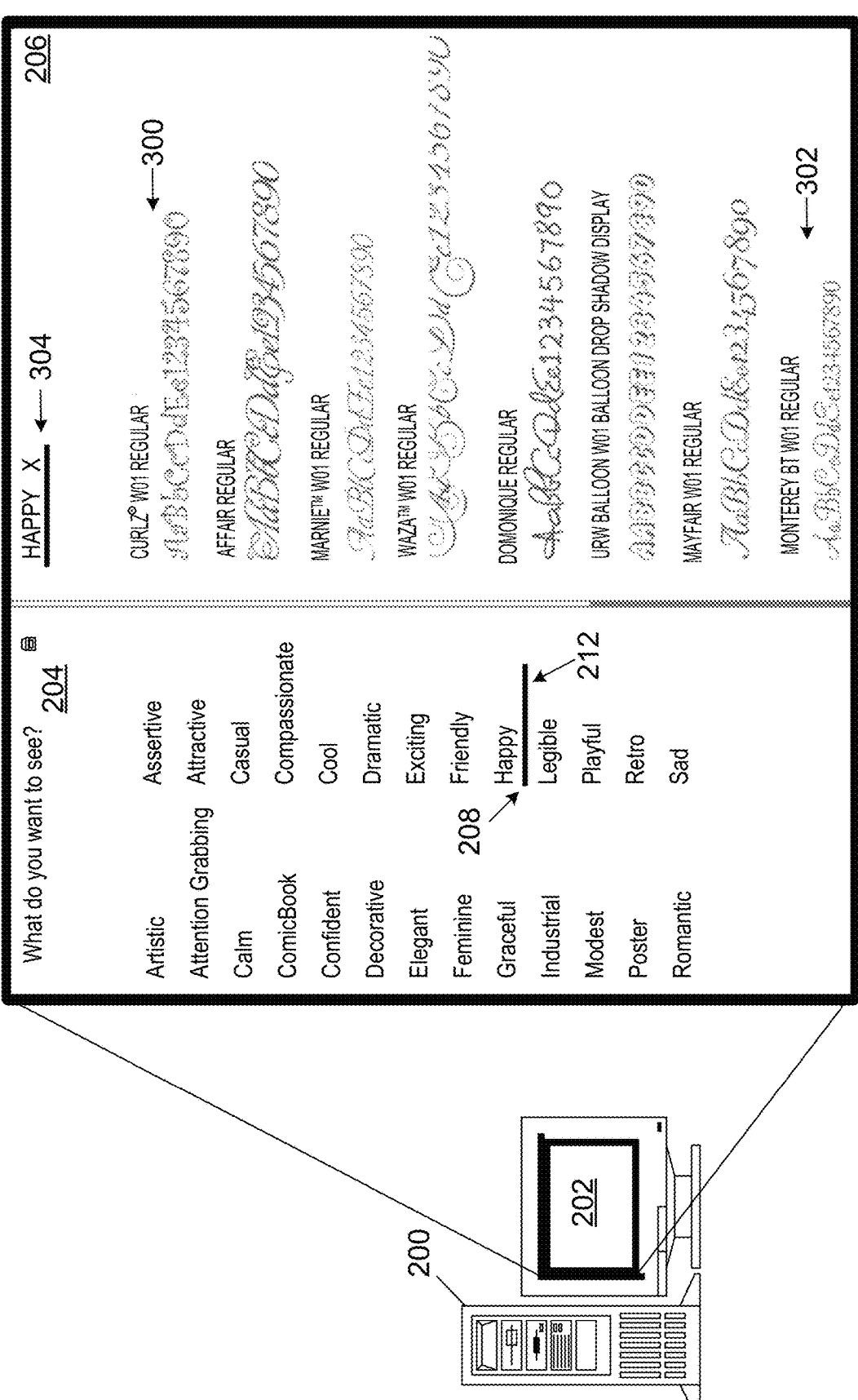

In response to the attribute selection in the menu 204, the panel 206 presents a listing of fonts identified as representing the selected attribute (e.g., fonts that convey a happy emotion). In this example, the fonts are ordered from top (of the pane 206) to bottom with the upper fonts (e.g., font 214) being identified as providing better matches and lower fonts (e.g., font 216) identified as providing a lesser match. The panel 206 also includes a graphical representation 218 of the selected attribute and an indication (e.g., a horizontal bar) of the selected level of interest. Similar to having attribute selection adjustments cause changes to the recommended fonts listed in the pane 206, adjusting the level of interest can also change the listed fonts. For example, referring to FIG. 3, the level of interest in the selected attribute (e.g., the "Happy" attribute) is increased and correspondingly the list of selectable recommended fonts changes. In this instance, the attribute is selected a second time (via user interactions with a pointing device) in the menu 204 and the right portion 212 of the horizontal bar 208 is graphically highlighted to indicate the interest in being recommended fonts that strongly reflect the "Happy" attribute. Based upon this selection, the fonts presented in pane 206 change and a different font (e.g., font 300) now appears at the top position of the selectable font recommendation list due to the desire of being presented font recommendations that strongly reflect the attribute. Similarly, changes appear while progressing down the list, including the font in the last presented position (e.g., font 302). To also assist the user in regards to the attribute and level of interest being used to identify the fonts, an updated graphical representation 304 is included in the pane 206 that indicates both the selected attribute and changed level of interest (e.g., a second level of interest).

Figure 4:
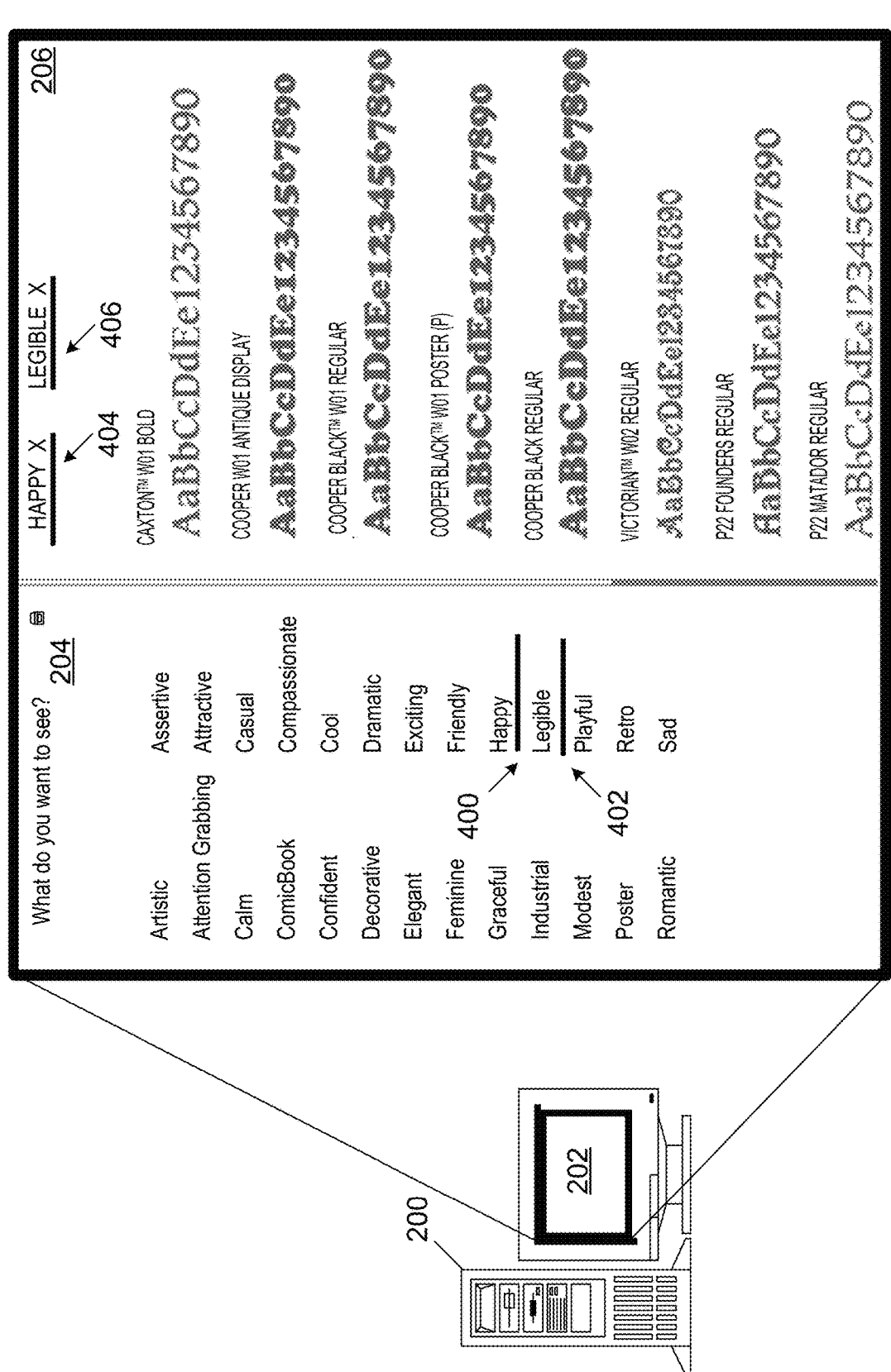

Referring to FIG. 4, similar to adjusting the level of interest in a font attribute, the number of number of attributes selected for identifying font recommendations may be adjusted. In this illustration, along with selecting one attribute ("Happy") a second attribute ("Legible") is selected. Further, the level of interest for each of these attributes is independently selected. In this example, a second level of interest is selected for both of the attributes as separately indicated by graphical horizontal bars 400 and 402 provided in menu 204. Similar graphical representations 404 and 406 are included in the pane 206 that presents the list of fonts that reflect these multiple attributes and the respective level of interest selected for each attribute. Compared to the font lists presented in FIGS. 2 and 3, the fonts presented in FIG. 4 clearly reflect the selection of the "Legible" attribute. The characters included in each recommended font have sharper defined shapes and the characters are quickly recognizable. While being more legible (with respect to the font listing presented in FIGS. 2 and 3), the fonts also include shapes that convey an uplifting emotion as directed by the selection of the "Happy" attribute.

Figure 5:
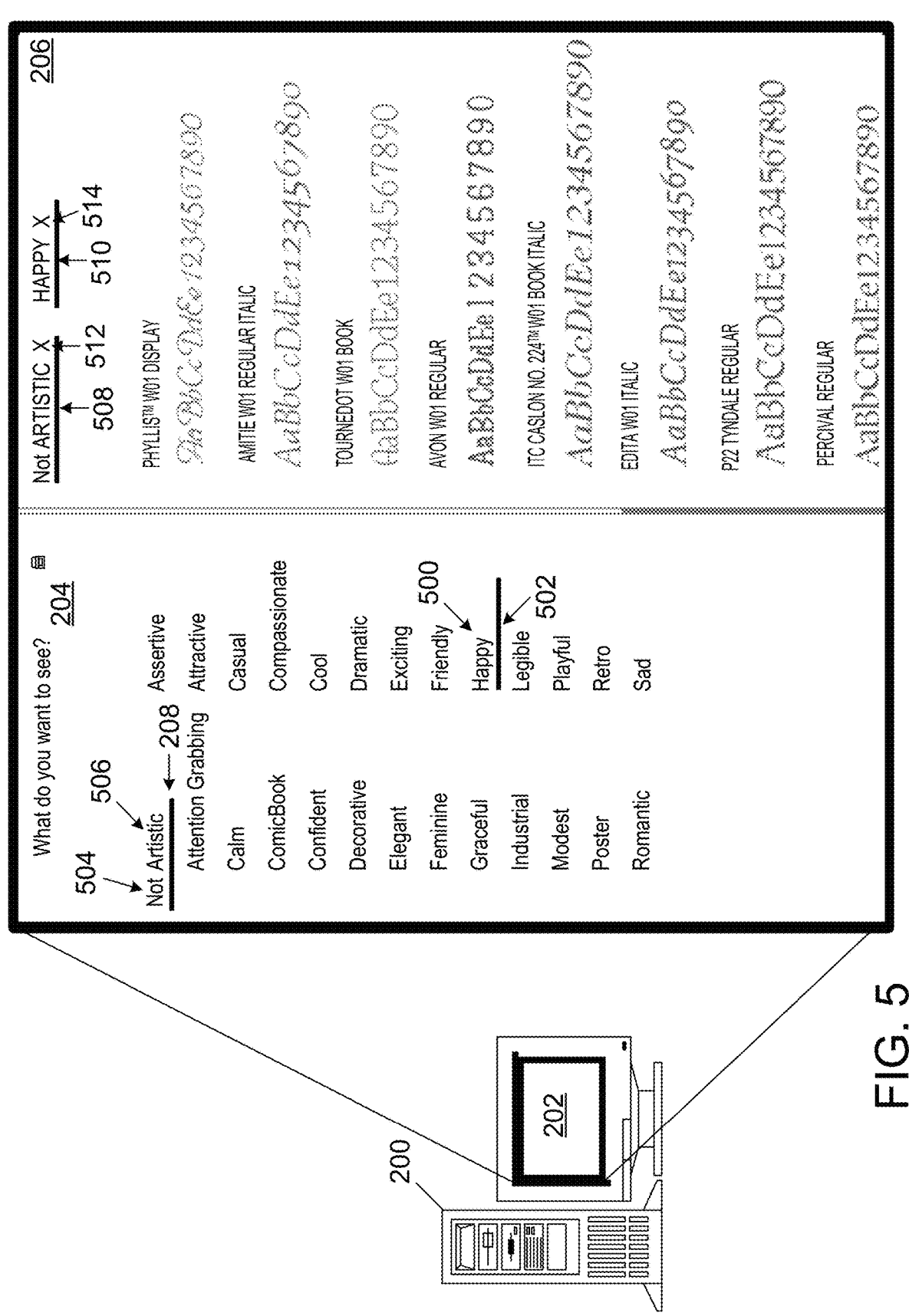

Referring to FIG. 5, attributes may be selected so that fonts are identified that are absent graphical characteristics of an attribute. By providing this functionality, a designer can clearly indicate what graphical qualities are not of interest for a project under development. As illustrated, selecting the absent of an attribute in menu 204 can be performed in a manner similar to selecting an attribute. As demonstrated in previous figures, one attribute 500 (e.g., "Happy") is selected having a second level of interest (by using a pointing device to twice select the attribute) as indicated by a horizontal bar 502. One or more techniques may be employed to allow a user to select that a particular attribute is undesired and should be absent from recommended fonts. For example, another selectable graphic can be presented to allow the user to indicate his or her interest in not having an attribute reflected in font recommendations. In this illustrated arrangement, a graphic 504 (e.g., the word "Not") appears next to an attribute 506 (e.g., the term "Artistic") when the pointer (controlled by the pointing device) hovers in a location to the left of an attribute. By selecting the graphic 504 (with the pointing device), the user indicates that graphical aspects of the attribute 506 should not be represented in the font recommendations. Additionally, a level of interest can similarly be selected when requesting the absence of an attribute. As represented by horizontal bar 208, the graphic 504 has been twice selected for setting a second level, which represents a strong interest in not having the attribute 506 represented in font recommendations. A lesser level of interest may similarly be chosen by selecting the graphic 504 once. With the attributes and levels of interest selected, font recommendations are produced and presented on the pane 206. Additionally, attribute graphics 508 and 510 are included in the pane 206 and illustrate the selected attributes and their respective level of interest. Additional, a selectable graphic 512, 514 is included with each of the attribute graphics to allow the user to remove the corresponding attribute entirely from being used for identifying font recommendations.

Figure 6:
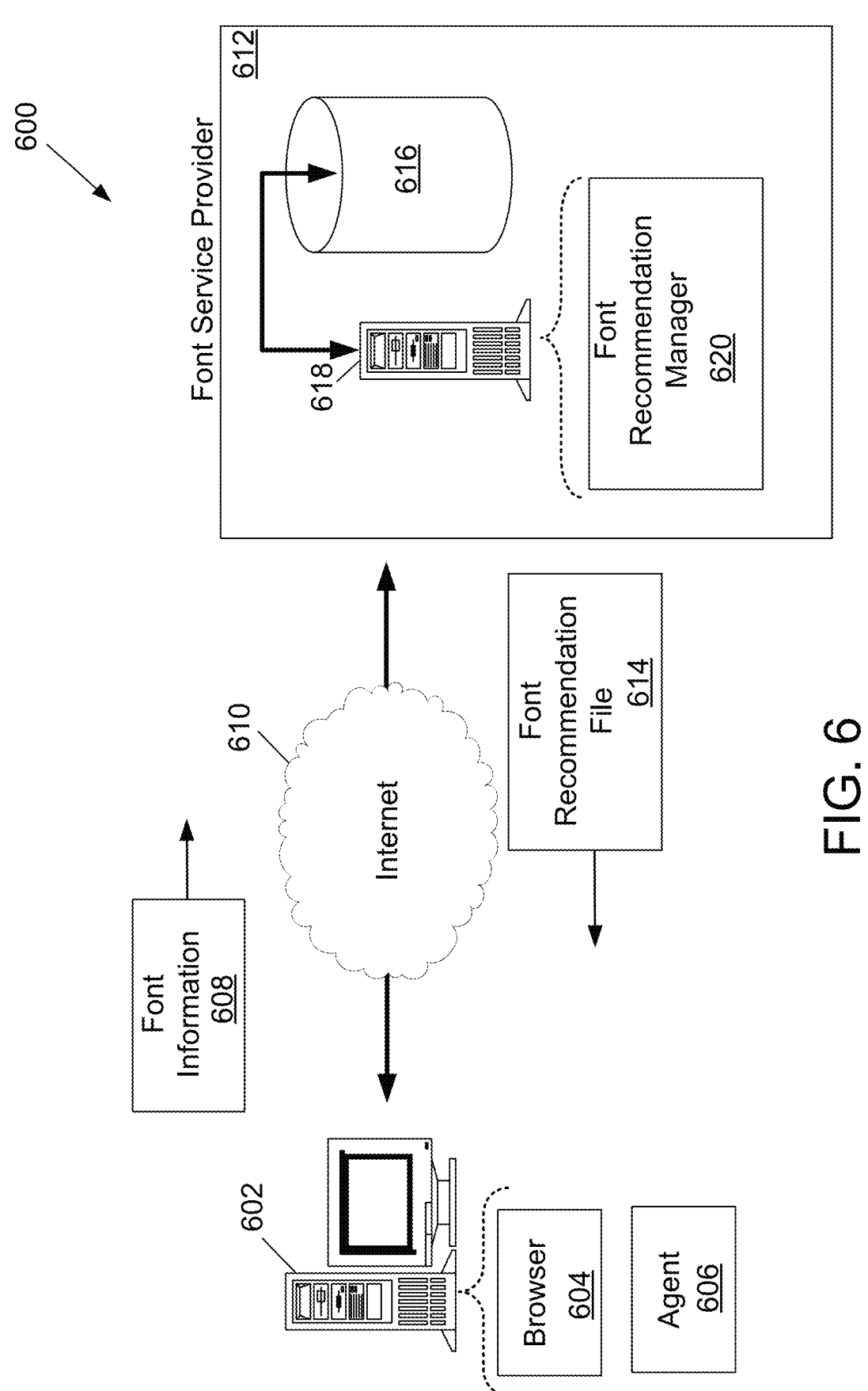
FIG. 6 is a block diagram of a network environment including a font service provider that manages font recommendations.

Referring to FIG. 6, a computing environment 600 is presented that includes a computer system 602 that a user (e.g., designer) may interact with (using a keyboard, a pointing device, etc.) for gathering information (e.g., font attributes, level of interest, etc.) and presenting information (e.g., font recommendations). In this arrangement, a browser application 604 provides an interface for collecting information from the user and presenting information, however, other types of applications and processes may be employed. In one possible arrangement, the computer system 602 may execute a software agent 606 that collects information associated fonts (e.g., previous attribute and level of interest selections, fonts selected from recommendations, etc.). In some arrangements the software agent 606 may solicit information from a user (e.g., initiate surveys, etc.), or collect information in an unsolicited manner (e.g., collect pointing device movements, click data, etc.). Such agents can be considered a software module that is executable in a substantially autonomous manner. For example, upon being provided access to the computer system 602, a software agent may operate without considerable user interaction. By operating in a somewhat flexible manner, the software agent can adaptively address font information needs. The software agent 606 may operate in a somewhat persistent manner to identify information such as font attributes, levels of interest, selected recommended fonts, etc. For example, the software agent 306 may execute in a substantially continuous manner.

In the presented environment 600, font information 608 (e.g., selected attribute(s), level(s) of interest, etc.) is sent over one or more networks (e.g., the Internet 610) to a font service provider 612 for processing (e.g., identifying fonts for recommendation, etc.). After the provided information is processed to identify fonts to recommend, one or more techniques may be implemented to provide the recommendations to the computer system 602 or other computing devices. For example, one or more files may be produced by the font service provider 612 to send font recommendations 614 to the computer system 602. In some arrangements, the font service provider 612 may also provide the software agents to the computing devices in order to perform operations, such as collecting font attribute related information (e.g., selected recommended fonts, etc.), as needed. Agents delivered from the font service provider 612 may also provide other functions; for example, collecting other types of information, for example, sales information or survey responses to assist in characterizing various fonts with respect to different attributes.

To process and store information associated with font attributes being provided by the computer system 602, the font service provider 612 typically needs access to one or more libraries of fonts, font information, etc. that may be stored locally, remotely, etc. For example, font libraries and libraries of font information may be stored in a storage device 616 (e.g., one or more hard drives, CD-ROMs, etc.) on site. Being accessible by a server 618, the libraries may be used, along with information provided from computing devices, software agents, etc., to collect font attribute and levels of interest information, identify font recommendations, provide the font recommendations to end users (e.g., via the pane 206), etc. Illustrated as being stored in a single storage device 616, the font service provider 612 may also use numerous storage techniques and devices to retain collections of font information. Lists of fonts, attributes and related information can also be stored (e.g., on the storage device 616) for later retrieval and use. The font service provider 612 may also access font information at separate locations as needed. For example, along with identifying font recommendations for the computer system 602, the server 618 may be used to collect needed information from one or more sources external to the font service provider 612 (e.g., via the Internet 610).

Along with collecting and processing font attributes, and providing font recommendations; the font service provider 612 may contribute other functions. For example, determining multiple fonts as being similar may be determined by the font service provider 612 as described in U.S. patent application Ser. No. 14/046,609, entitled "Analyzing Font Similarity for Presentation", filed 4 Oct. 2013, and, U.S. patent application Ser. No. 14/694,494, entitled "Using Similarity for Grouping Fonts and Individuals for Recommendations", filed 23 Apr. 2015, both of which are incorporated by reference in their entirety. The font service provider 612 may also provide the functionality of characterizing and pairing fonts (based upon one or more rules) as described in U.S. patent application Ser. No. 14/690,260, entitled "Pairing Fonts for Presentation", filed 17 Apr. 2015, which is also incorporated by reference in its entirety. In some arrangements, one or more of these functions may be provided on one or more user interfaces (UI's), application program interfaces (API's), etc. By employing these technologies, additional functionality may be provided along with recommended fonts that may more likely satisfy the interest of end users. To provide such functionally, the server 618 executes a font recommendation manager 620, which, in general, identifies font recommendations based upon attributes and levels of interest selected by a user. The font recommendation manager 620 may also provide other functionality such as collecting information and identifying attributes as being associated with particular fonts. Further, the strength that each attribute is graphically reflected in a particular font along with how the font ranks among other fonts based upon the selected attributes and levels of interest can be determined. To collect and use additional information in these determinations, the font service provider 612 may perform operations (e.g., tracking, monitoring, etc.) regarding other user interactions. For example, records may be stored (e.g., in storage device 616) that reflect particular fonts that have been requested, licensed, etc. and provided to particular users, etc.

The environment 600 may utilize various types of architectures to provide this functionality. For example, to process information (e.g., provided font information 608, survey data, monitored user interactions, etc.) to prepare font recommendations, etc., the environment may employ one or more knowledge-based systems such as an expert system. In general, such expert systems are designed solving relatively complex problems by using reasoning techniques that may employ conditional statements (e.g., if-then rules). In some arrangements such expert systems may use multiple systems such as a two sub-system design, in which one system component stores structured and/or unstructured information (e.g., a knowledge base) and a second system component applies rules, etc. to the stored information (e.g., an inference engine) to determine results of interest (e.g., font recommendations).

Figure 7:
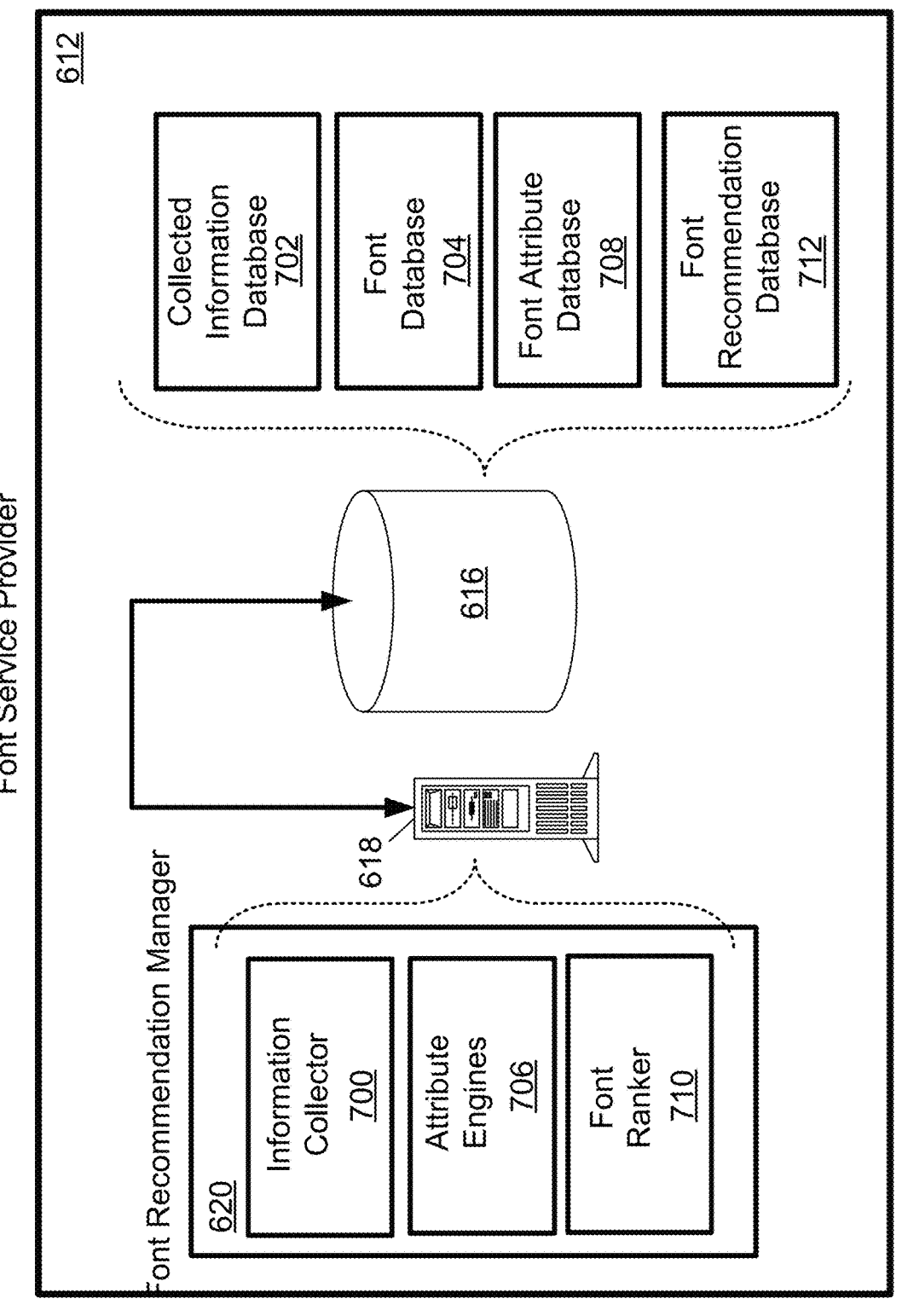
FIG. 7 is a block diagram of a font service provider.

Referring to FIG. 7, the font service manager 620 (which includes a number of modules) is executed by the server 618 present at the font service provider 612. In this arrangement, the font recommendation manager 620 includes an information collector 700 that is capable of receiving data that represents how attributes are reflected in particular fonts. For example, survey data may be collected that provides how individuals (e.g., users, designers, etc.) view attribute/font relationships. In this arrangement, such data may be previously stored (e.g., surveys stored in a collected information database 702) and retrieved from the storage device 616. Data representing such survey information may also be retrieved from one or more sources external to the font service provider 612; for example such information may be attained from one or more storage devices of a survey manager (e.g., an entity separate from the font service provider 612). Along with survey information, the storage device 616 (or other storage devices at the font service provider 612) may contain a font database 704 that includes information about numerous fonts, font attributes, etc. From the information stored in the font database 404, data may be retrieved to produce surveys for determining how particular attributes are reflected in particular fonts. For example, the font database 704 may include data that represents various types of font families (e.g., Times New Roman, Arial, etc.) that typically include a set of fonts (e.g., regular, italic, bold, bold italic, etc.). Data for each font may represent a set of individual character shapes (glyphs). Such glyphs generally share various design features (e.g., geometry, stroke thickness, serifs, size, etc.) associated with the font. To represent such fonts one or more techniques may be utilized; for example, outline-based representations may be adopted in which lines and curves are used to define the borders of glyphs. Along with different design features, fonts may differ based on functional aspects, such as the languages (e.g., English, Chinese, Russian, etc.) for which the fonts are used. Typically fonts are scalable for a variety of sizes (e.g., for presenting by various computing devices) and may be represented in one or more formats. For example, scalable outline fonts may be represented in a format that includes data structures capable of supporting a variety of typographic visual symbols of many languages.

In this example, attribute engines 706 are included in the font recommendation manager 620 and use information in the collected information database 702 (e.g., survey data, etc.) to identify fonts that reflect attributes, levels of interest associated with attributes, etc. In one arrangement, survey data and font data are used to train the attribute engines 706 to determine attributes for other fonts. For example, the attribute engines may determine a numerical value for each of the multiple attributes present in a font (to characterize to font). For example, a font including graphical features considered to convey an uplifting emotion, a large numerical value may be determined and assigned to the "Happy" attribute. However, if the shapes and scripts of the font are fanciful, a relatively low value may be assigned to the "Legible" attribute. By having multiple numerical values represent the font, the attribute values can be grouped into a vector quantity. Referring back to the list of attributes presented in menu 204, such a vector may contain values for thirty-one attributes, however, a larger or smaller number of attributes may be represented in the vector for a font.

Once determined, the attribute vector quantities for each font can be stored for later retrieval and use. In this arrangement, a font attribute database 708 is stored in the storage device 616 and retains the vector quantities and potentially other information (e.g., attribute definitions, logs regarding attribute updates, etc.). To produce the lists of font recommendations, the font recommendation manger 620 includes a font ranker 710. Along with preparing the recommendation for sending to a user device such as the computer system 200 (shown in FIG. 2), the font ranker 710 may perform other operations such as storing determined lists of font recommendations for future retrieval and use. For example, the storage device 616 includes a font recommendation database 712 that stores previously determined recommended font lists. By storing such data, computation efficiency can be improved by using a previously determined recommendation rather than re-computing a list of recommended fonts.

Figure 8:
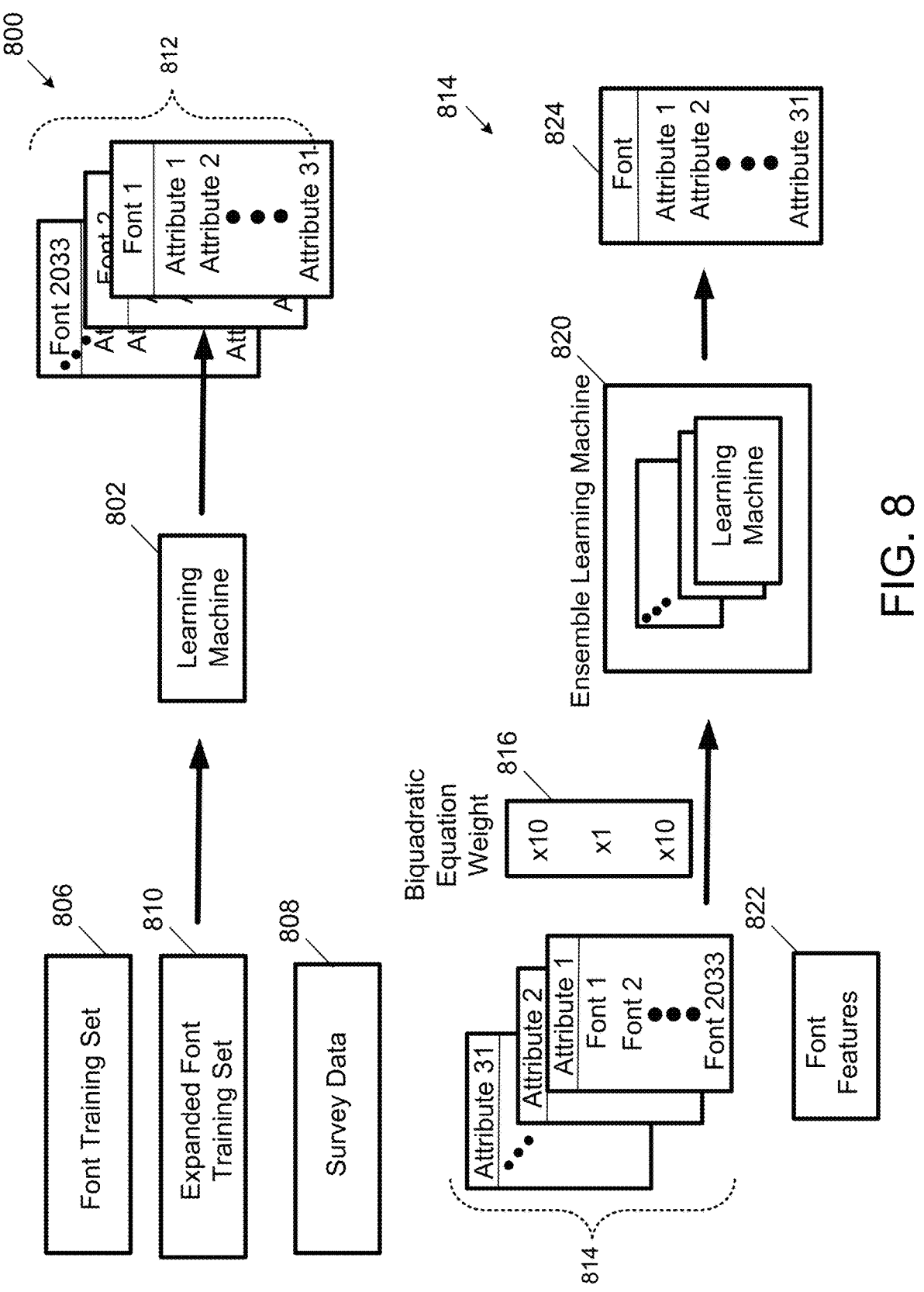
FIG. 8 is a graphical representation of training learning machines to provide font recommendations.

Referring to FIG. 8, data flows are graphically presented that illustrate operations performed by the font recommendation manager 620. One or more techniques may be employed by the manager to determine font attributes for fonts and process font attributes to make font recommendations. For example, one or more forms of artificial intelligence, such as machine learning, can be employed such that a computing process or device may learn to determine attributes for fonts. To provide this functionality, machine learning may employ techniques such as regression to characterize fonts by the font attributes. Upon being trained, a learning machine may be capable of outputting a numerical value that represents the amount an attribute is reflected in a font. Input to the trained learning machine may take one or more forms. In one arrangement, survey data and representations of fonts may be provide the input. The survey data can include information that associates fonts to different attributes (as determined by the survey takers). For the input that represents the fonts used in the surveys, representations of the font itself may be provided (e.g., bitmaps of font characters). Numerical representations of fonts may also be used as input to the learning machine (e.g., particular features that uniquely describe each font). For example, font features (e.g., fifty-eight separate features) can be utilized such as the features described in U.S. patent application Ser. No. 14/694,494, entitled "Using Similarity for Grouping Fonts and Individuals for Recommendations", filed 23 Apr. 2015, and, U.S. patent application Ser. No. 14/690,260, entitled "Pairing Fonts for Presentation", filed 17 Apr. 2015, both of which are incorporated by reference in their entirety. From this information, the learning machine can output a series of numerical values that represent each of the attributes (e.g., a value reflecting the "Happy" attribute, a value reflecting the "Artistic" attribute, etc.). For example, each output values may range 0-1.0 in which low values (e.g., 0.2) represent that the font does not convey a particular attribute and higher values (e.g., 0.8, 1.0) to convey the attribute is strongly represented in the font. Various techniques may be employed to provide font information, for examples, one or more files may be provided from which font features may be produced. For example, a file including outline information of a font (e.g., an OpenType font file or ".otf" file) may be input into a machine learning system and used to produce font features (from the font outlines). In some arrangements, the input file (or files) may be used by a renderer included in the machine learning system to produce an image (e.g., one or more bitmap images) to be used for feature determination.

To implement such an environment, one or more machine learning techniques may be employed. For example, supervised learning techniques may be implemented in which training is based on a desired output that is known for an input. Supervised learning can be considered an attempt to map inputs to outputs and then estimate outputs for previously unseen inputs (a newly introduced input). Unsupervised learning techniques may also be used in which training is provided from known inputs but unknown outputs. Reinforcement learning techniques may also be employed in which the system can be considered as learning from consequences of actions taken (e.g., inputs values are known and feedback provides a performance measure). In some arrangements, the implemented technique may employ two or more of these methodologies.

In some arrangements, neural network techniques may be implemented using the font data (e.g., vectors of numerical values that represent features of the fonts, survey data, etc.) to invoke training algorithms for automatically learning the fonts and related information. Such neural networks typically employ a number of layers. Once the layers and number of units for each layer is defined, weights and thresholds of the neural network are typically set to minimize the prediction error through training of the network. Such techniques for minimizing error can be considered as fitting a model (represented by the network) to training data. By using the font data (e.g., font feature vectors), a function may be defined that quantifies error (e.g., a squared error function used in regression techniques). By minimizing error, a neural network may be developed that is capable of determining attributes for an input font. Other factors may also be accounted for during neutral network development. For example, a model may too closely attempt to fit data (e.g., fitting a curve to the extent that the modeling of an overall function is degraded). Such overfitting of a neural network may occur during the model training and one or more techniques may be implements to reduce its effects.

One type of machine learning referred to as deep learning may be utilized in which a set of algorithms attempt to model high-level abstractions in data by using model architectures, with complex structures or otherwise, composed of multiple non-linear transformations. Such deep learning techniques can be considered as being based on learning representations of data. In general, deep learning techniques can be considered as using a cascade of many layers of nonlinear processing units for feature extraction and transformation. The next layer uses the output from the previous layer as input. The algorithms may be supervised, unsupervised, combinations of supervised and unsupervised, etc. The techniques are based on the learning of multiple levels of features or representations of the data (e.g., font features). As such multiple layers of nonlinear processing units along with supervised or unsupervised learning of representations can be employed at each layer, with the layers forming a hierarchy from low-level to high-level features. By employing such layers, a number of parameterized transformations are used as data propagates from the input layer to the output layer.

Employing such machine learning techniques, a considerable amount of survey data and font information (e.g., one or more vectors of data representing font features such as fifty-eight features) may be used as input to produce an output that represents font attributes. For example, an output data vector may provide a numerical value for each of the thirty-one attributes listed in the menu 204.

As illustrated in the figure, a data flow 800 represents information being provided to a learning machine 802 for producing an output vector of "N" attribute values (wherein N=31 to provide an attribute value for each of the attributes listed in menu 204). In this example, a set of training fonts 806 (e.g., fifty-eight features for each training font) is input into the learning machine 802 to determine an output attribute vector. In one arrangement, the font training set 806 includes approximately 1200 fonts (e.g., 1233 fonts) that cover a variety of different font styles. These 1200 fonts are also used to collect survey data in which survey takers select how particular fonts relate to attributes (e.g., the thirty-one attributes listed in menu 204). For example, the fonts may be clustered to form 411 groups in which group members are of similar type. Fonts from different groups can be selected and used to form the basis of survey questions. In some instances, pairs of fonts from the same group are used to produce survey questions. In some arrangements, a set of survey questions (e.g., five thousand questions, ten thousand questions, etc.) are used for each attribute (e.g., the thirty-one attributes); thereby a considerable total number of questions are prepared (e.g., one hundred fifty-five thousand, three hundred ten thousand, etc.). In some instances, bias may be applied to survey questions, for example, predefined notions of attributes, fonts, etc. may be included in survey questions (e.g., a pre-survey notion that one or more particular fonts would be considered to reflect a particular attribute, multiple attributes, an absence of an attribute, etc.). Such biased questions can also provide a bolstering effect; for example, by steering questions towards particular fonts and attributes less questions may be needed to identify relationships. In some arrangements, separate surveys may be used for selecting one or more attributes, vetting one or more attributes, etc. For example, questions may be posed to survey takers for identifying particular attributes that better describe qualities reflected in a font (e.g., an attribute labeled "confident" may provide a better description of font qualities than an attribute labeled "self-reliant"). Other techniques such as machine learning techniques may be employed to optimize the selection of attributes for use in describing font qualities. For example, using different sets of attributes to train a learning machine, appropriate attributes may emerge and be identified based on the output attributes selected by the trained machine to represent one or more input fonts. To execute the surveys various techniques may be employed, for example, a crowdsourcing Internet marketplace such as the Amazon Mechanical Turk. Responses from the surveys are used to create survey data 808 that is input into the learning machine 802. Along with the fonts used to produce the surveys, additional fonts may be provided as input. In this example, approximately eight-hundred additional fonts are input as an expanded font training set to the learning machine 802. To provide this data, features of the expanded training set 810 are input and are similar in type to the features used for the training set 806 (e.g., fifty-eight feature are used to characterized each font). With this data, the learning machine produces an output for each input font. As illustrated in this example, a vector of numerical values representing each of the attributes (e.g., thirty-one attributes) are output for each font (e.g., 1233 training set fonts+800 expanded training set fonts=2033 total fonts) to create a collection of vectors 812. In some arrangements, the data included in the vector collection 812 may be reviewed and edited prior to additional processing, for example, one or more individuals may review the attributes values for one or more of the fonts and make adjustments (e.g., change values, etc.).

Armed with this output data, the font recommendation manager 620 can use this font attribute information to train another learning machine for producing attribute vectors of any other font (e.g., thousands, tens of thousands, etc. of other fonts). The training and use of this second learning machine is illustrated in data flow 814. In this example, training data is prepared by sorting the collection of 2033 vectors 812 (that provide thirty-one attribute values for each font) into a collection of vectors 814 that represent each how font is associated with each attribute. As illustrated, collection 814 includes thirty-one vectors (one for each attribute), and each vector includes 2033 values (one value for each font). For each attribute, the fonts are sorted (e.g., in descending order) such that the upper fonts are most closely associated with the attribute (e.g., have large numerical attribute values) and fonts lower on the list are not as closely associated with the attribute (e.g., have relatively small numerical attribute values). Similar sorting is executed by the font recommendation manager 620 for the vectors of the other attributes in the collection 814. Along with sorting, other processing may be executed on the values in each of the attribute vectors prior to being used in learning machine training. For example, unequal weights may be applied to the vector values to magnify errors for the upper and lower portion of the vectors. In one example, a biquadratic equation is applied to each vector (e.g., a multiplier value of 10 is applied to values located in the upper and lower portions of the vector while a multiplier values of 1 is applied to values located at the middle portion of the vector) to magnify error at upper and lower portions of the vector for training the learning machine. By applying such weighting 816, or other types of weighting and processing, the ability of the learning machine to match other fonts to the attributes may be improved. The weighted vectors are provided to train an ensemble learning machine 820, which includes a number (e.g., five, eight, etc.) of learning machines (e.g., the attribute engines 706). In this example, each individual learning machine included in the ensemble 820 performs similar tasks to compute an attribute vector (e.g., a vector of 31 values that represent the 31 attributes presented in menu 204) for a font (e.g., represented by font features 822) input into the ensemble learning machine 820. Here, each learning machine in the ensemble 820 are similar (e.g., all five are deep learning machines); however, in some arrangements two or more of the machines may employ different architectures. After an output vector is computed by each of learning machines, the results of the machines may be processed. For example, an output attribute vector 824 is attained in this example by averaging the numerical values of corresponding attributes in each output vector of the learning machines of the ensemble 820. As illustrated in the figure, attribute 1 of the vector 824 is determined by averaging the output quantities for attribute 1 for each of the five learning machines of ensemble 820. Numerical values for attributes two through thirty-one of vector 824 are determined by performing similar averaging operations to compute the attribute values for font 822 from the trained learning machine ensemble 820; however, other processing techniques may be employed to determine the attribute values.

Figure 9:
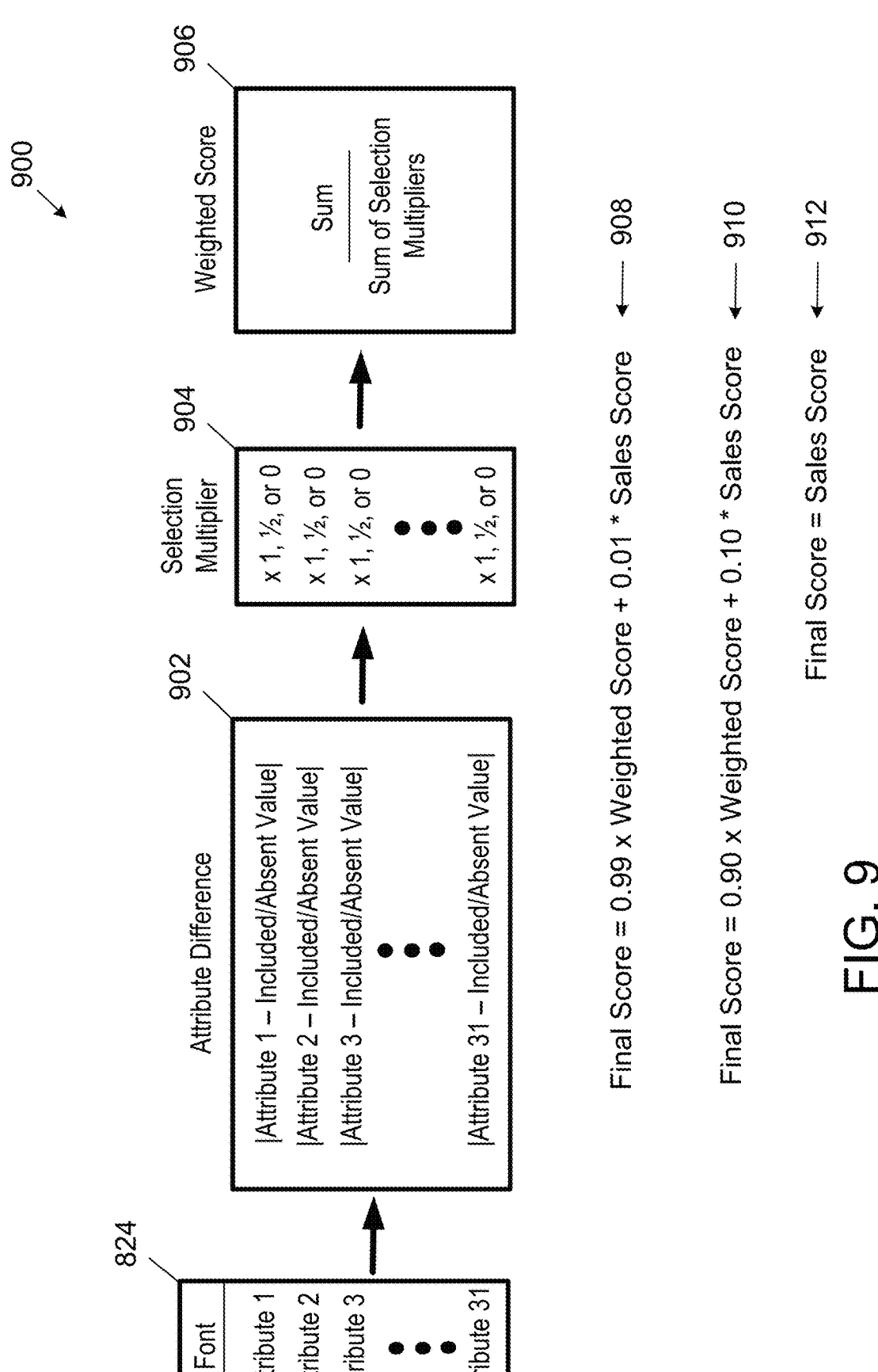
FIG. 9 is a graphical representation for identifying fonts from selected attributes.

Referring to FIG. 9, upon determining the attribute values for a font, these values can be used to calculate a score (via the font ranker 701) for ranking the font based upon the attribute(s) selected and the level(s) of interest selected by a user (via the menu 204). In one example, weighted versions of the attribute values can be summed and the quantity normalized to compute a score. In some arrangements, additional information may be used for scoring individual fonts. For example, sales information may be combined with the attribute data to assign a score to a font. With the score assigned, the fonts can then ranked based upon their score and presented. For example, higher ranked fonts may be presented initially in a list (e.g., at the top of a list presented on the pane 206) followed by lower ranked fonts (e.g., towards the bottom of the list presented in the pane 206). Provided the ranked list, the user can select one or more fonts based upon their appearance relative to the selected attribute(s) and level(s) of interest.

In the figure, one technique is illustrated by a data flow 900 for computing a score for the calculated attributes (output by the ensemble learning machine 820) for the font features 822. From the attribute vector quantity 824, an attribute difference 902 is calculated in which the difference between each attribute value and a value that represents the level of interest selected for that attribute (e.g., in menu 204). For example, one value (e.g., a value of 0.0) can represent if the selected level of interest indicates that the attribute is to be reflected in the recommended fonts, or, another value (e.g., a value of 1.0) represents if the selected level of interest indicates that the attribute should be absent from the recommended fonts. Once calculated, the attribute differences 902 can be weighted based upon the selected level of interest. For example, a selection multiplier 904 can be applied to each attribute difference based upon the level of interest selected for that attribute. As illustrated in this example, one multiplier value (e.g., 1) can be applied if a high level of interest (e.g., the second level) has been selected, and, a smaller multiplier (e.g., ½) is selected if a lower level of interest (e.g., the first level) has been selected. For the instances in which an attribute was not selected for use, another multiplier value (e.g., 0) can be applied. In this case, the zero value multiplier in effect removes the corresponding attribute from being used in the score computation. Next, a single value is attained from the weighed attribute differences by aggregating the values. In the figure, a weighted score 906 is attained by summing the weighed attribute differences and normalizing the value by dividing the sum of the selection multipliers. In other examples, different operations, normalizing techniques, etc. may be employed.

In this arrangement, upon a single quantity (e.g., a normalized sum of weighted attribute differences) being determined, other information is applied to calculate a final score for the font. For example, sales data associated with each font can be applied such that frequently licensed fonts are more highly ranked compared to fonts that are rarely licensed. To incorporate such sale data various techniques may be employed, for example, a numerical score (e.g., ranging from 0.0 for low sales to 1.0 for considerable sales) may be assigned to font. In this example, a final score is calculated from the weighted score for the font 906, the assigned sales score, and the number of attributes selected in the menu 204. Equation 908 represents the situation in which multiple attributes have been selected in the menu or for the situation in which only a single attribute is selected but with a high level of interest (e.g., a second level of interest). Equation 910 represents the scenario in which only a single attribute is selected and a lower level of interest is selected (e.g., a first level of interest). Equation 912 governs when no attributes have been selected. In this situation, the final score for ranking the font is equal to the sales score assigned to that font. As such, if no attributes are of interest for ranking the fonts in pane 206, other data such as sales information is used such that a ranking is always presented. With this information determined (e.g., by the font ranker 710), the font recommendation manager 620 can identify and rank font recommendations for delivery to the requesting user device (e.g., computer system 602) for presentation to a designer for review and selecting one or more of the recommended fonts.

Similar to identifying one or more fonts based upon a selected attribute (or attributes) and a level of interest (or levels of interest), these techniques may be employed in other endeavors. Other than fonts, other types of items may be identified; for example, different types of graphical based items such as photographs, emoji's (small digital images or icons used to express an idea, emotion, etc. in electronic communications (e.g., email, text messages, etc.), page layouts for electronic assets (e.g., electronic documents, web pages, web sites, etc.). Attributes for such items may be similar to or different from the attributes used for the fonts. For example, an attribute similar to "Happy" may be used with for emoji's; however other descriptive attributes (e.g., urban setting, rural setting, etc.) may be used for items that are photographs. For such items, features may be determined and used for machine learning; however, just the attributes may be used along with the identified items for machine learning in some arrangement. Defining such features for these items may accomplished by one or more techniques. For example, one or more autoencoder techniques may be used reduce dimensionality to define features. In some arrangements, the autoencoder may use non-linear transformation techniques and be used for training one or more learning machines, during deployment of the learning machine(s), or both. Linear transformation techniques may be used alone or in concert with non-linear techniques for feature development. For example a linear transformation technique such as principal component analysis may be used to reduce dimensionality and extract features, e.g., from photographs.

Referring to FIG. 10, a flowchart 1000 represents operations of a font recommendation manager (e.g., the font recommendation manager 620 shown in FIG. 6) being executed by a computing device (e.g., the server 618 located at the font service provider 612). Operations of the font recommendation manager 620 are typically executed by a single computing device (e.g., the server 318); however, operations may be executed by multiple computing devices. Along with being executed at a single site (e.g., the font service provider 612), the execution of operations may be distributed among two or more locations. In some arrangements, a portion of the operations may be executed at a user device (e.g., the computing device 602), an intermediate computing device (e.g., located between a user device and the font service provider), one or more computing devices located external to the font service provider 612, etc.

Operations of the font recommendation manager 620 may include receiving 1002 data representing one or more user-selected font attributes. The data includes one of at least four selectable interest levels for each of the one or more user-selected item attributes. For example, the item attributes may be font attributes. Presented a listing of font attributes (e.g., the thirty-one attributes shown in menu 204) a user can select at least one attribute (e.g., "Happy") and one of four interest levels associated with the attribute (e.g., first level "Happy", second level "Happy", first level "Not Happy", and second level "Not Happy"). In this example, the first level reflects a lesser level of interest compared to the second level of interest. Operations may also include identifying 1004 one or more items representative of the selected interest level for each of the one or more user-selected item attributes. Again, for the example in which items are fonts, based upon attributes and level of interest (for each attribute), scores may be calculated for fonts, and a ranked list of the fonts (based on the assigned scores) may be produced (e.g., highly ranked fonts appear high on the recommendation list and low ranking fonts appear towards the bottom of the list). Operations may also include initiating 1006 delivery of data representing the identified one or more items for selection by the user. Again, for the example in which items are fonts, upon identifying a list of recommended fonts (ordered by their individual ranking), the list may be provided to a computing device of a designed for review and selection of a recommended font. By improving the efficiency in delivering fonts of interest to a designer, additional fonts may be selected to assist the designer with other projects while increase licensing frequency of more fonts.

Figure 11:
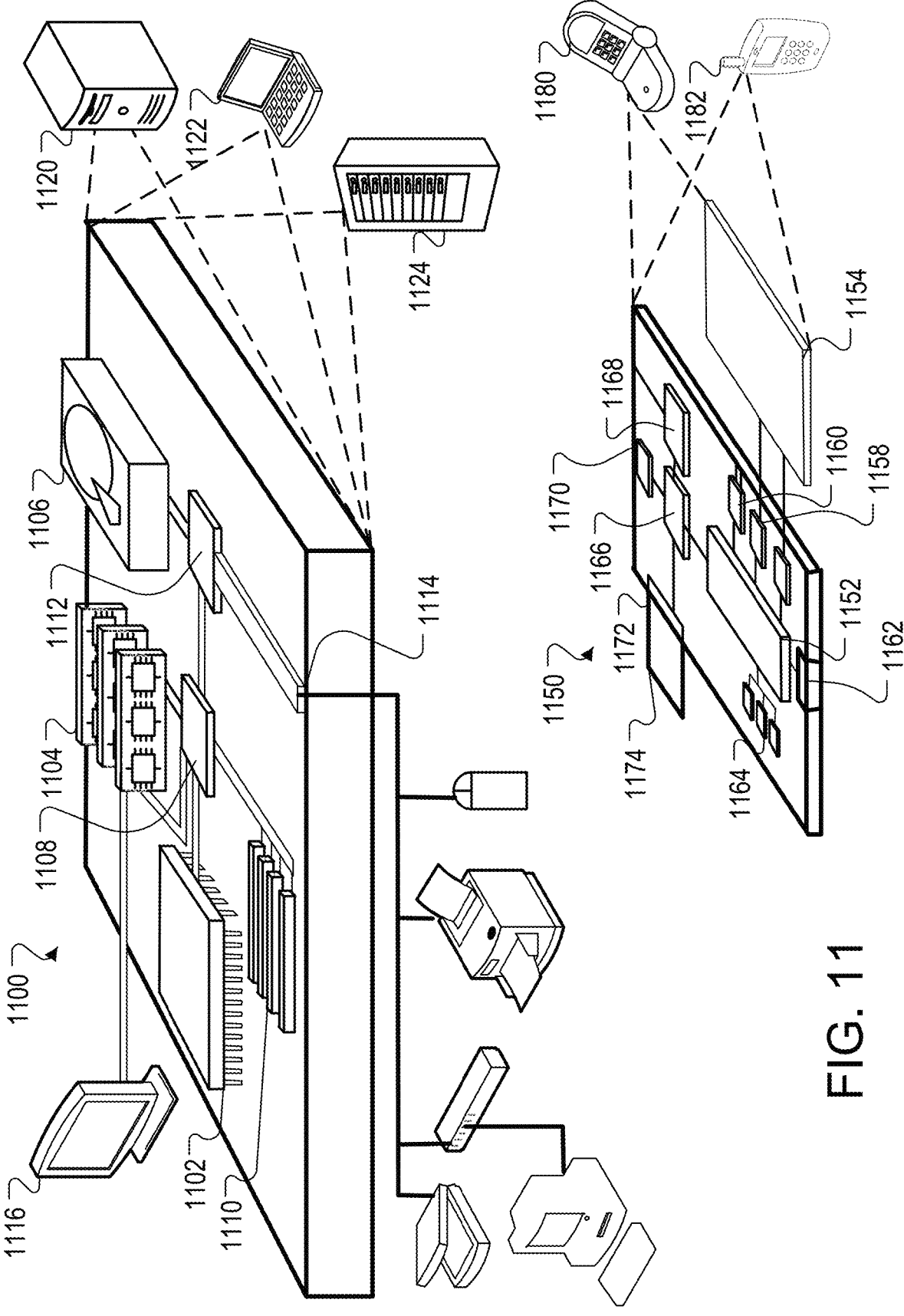
FIG. 11 illustrates an example of a computing device and a mobile computing device that can be used to implement the techniques described here.

FIG. 11 shows an example of example computing device 1100 and example mobile computing device 1150, which can be used to implement the techniques described herein. For example, a portion or all of the operations of font recommendations manager 620 (shown in FIG. 6) may be executed by the computing device 1100 and/or the mobile computing device 1150. Computing device 1100 is intended to represent various forms of digital computers, including, e.g., laptops, desktops, workstations, personal digital assistants, servers, blade servers, mainframes, and other appropriate computers. Computing device 1150 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 1100 includes processor 1102, memory 1104, storage device 1106, high-speed interface 1108 connecting to memory 1104 and high-speed expansion ports 1110, and low speed interface 1112 connecting to low speed bus 1114 and storage device 1106. Each of components 1102, 1104, 1106, 1108, 1110, and 1112, are interconnected using various busses, and can be mounted on a common motherboard or in other manners as appropriate. Processor 1102 can process instructions for execution within computing device 1100, including instructions stored in memory 1104 or on storage device 1106 to display graphical data for a GUI on an external input/output device, including, e.g., display 1116 coupled to high speed interface 1108. In other implementations, multiple processors and/or multiple busses can be used, as appropriate, along with multiple memories and types of memory. Also, multiple computing devices 1100 can be connected, with each device providing portions of the necessary operations (e.g., as a server bank, a group of blade servers, or a multi-processor system).

Memory 1104 stores data within computing device 1100. In one implementation, memory 1104 is a volatile memory unit or units. In another implementation, memory 1104 is a non-volatile memory unit or units. Memory 1104 also can be another form of computer-readable medium (e.g., a magnetic or optical disk. Memory 1104 may be non-transitory.)

Storage device 1106 is capable of providing mass storage for computing device 1100. In one implementation, storage device 1106 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 1104, storage device 1106, memory on processor 1102, and the like.)

High-speed controller 1108 manages bandwidth-intensive operations for computing device 1100, while low speed controller 1112 manages lower bandwidth-intensive operations. Such allocation of functions is an example only. In one implementation, high-speed controller 1108 is coupled to memory 1104, display 1116 (e.g., through a graphics processor or accelerator), and to high-speed expansion ports 1110, which can accept various expansion cards (not shown). In the implementation, low-speed controller 1112 is coupled to storage device 1106 and low-speed expansion port 1114. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 1100 can be implemented in a number of different forms, as shown in the figure. For example, it can be implemented as standard server 1120, or multiple times in a group of such servers. It also can be implemented as part of rack server system 1124. In addition or as an alternative, it can be implemented in a personal computer (e.g., laptop computer 1122.) In some examples, components from computing device 1100 can be combined with other components in a mobile device (not shown), e.g., device 1150. Each of such devices can contain one or more of computing device 1100, 1150, and an entire system can be made up of multiple computing devices 1100, 1150 communicating with each other.

Computing device 1150 includes processor 1152, memory 1164, an input/output device (e.g., display 1154, communication interface 1166, and transceiver 1168) among other components. Device 1150 also can be provided with a storage device, (e.g., a microdrive or other device) to provide additional storage. Each of components 1150, 1152, 1164, 1154, 1166, and 1168, are interconnected using various buses, and several of the components can be mounted on a common motherboard or in other manners as appropriate.

Processor 1152 can execute instructions within computing device 1150, including instructions stored in memory 1164. The processor can be implemented as a chipset of chips that include separate and multiple analog and digital processors. The processor can provide, for example, for coordination of the other components of device 1150, e.g., control of user interfaces, applications run by device 1150, and wireless communication by device 1150.

Processor 1152 can communicate with a user through control interface 1158 and display interface 1156 coupled to display 1154. Display 1154 can be, for example, a TFT LCD (Thin-Film-Transistor Liquid Crystal Display) or an OLED (Organic Light Emitting Diode) display, or other appropriate display technology. Display interface 1156 can comprise appropriate circuitry for driving display 1154 to present graphical and other data to a user. Control interface 1158 can receive commands from a user and convert them for submission to processor 1152. In addition, external interface 1162 can communicate with processor 1142, so as to enable near area communication of device 1150 with other devices. External interface 1162 can provide, for example, for wired communication in some implementations, or for wireless communication in other implementations, and multiple interfaces also can be used.

Memory 1164 stores data within computing device 1150. Memory 1164 can be implemented as one or more of a computer-readable medium or media, a volatile memory unit or units, or a non-volatile memory unit or units. Expansion memory 1174 also can be provided and connected to device 1150 through expansion interface 1172, which can include, for example, a SIMM (Single In Line Memory Module) card interface. Such expansion memory 1174 can provide extra storage space for device 1150, or also can store applications or other data for device 1150. Specifically, expansion memory 1174 can include instructions to carry out or supplement the processes described above, and can include secure data also. Thus, for example, expansion memory 1174 can be provided as a security module for device 1150, and can be programmed with instructions that permit secure use of device 1150. In addition, secure applications can be provided through the SIMM cards, along with additional data, (e.g., placing identifying data on the SIMM card in a non-hackable manner.)

The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 1164, expansion memory 1174, and/or memory on processor 1152), which can be received, for example, over transceiver 1168 or external interface 1162.

Device 850 can communicate wirelessly through communication interface 1166, which can include digital signal processing circuitry where necessary. Communication interface 1166 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 1168. In addition, short-range communication can occur, e.g., using a Bluetooth®, WiFi, or other such transceiver (not shown). In addition, GPS (Global Positioning System) receiver module 1170 can provide additional navigation- and location-related wireless data to device 1150, which can be used as appropriate by applications running on device 1150. Sensors and modules such as cameras, microphones, compasses, accelerators (for orientation sensing), etc. may be included in the device.

Device 1150 also can communicate audibly using audio codec 1160, which can receive spoken data from a user and convert it to usable digital data. Audio codec 1160 can likewise generate audible sound for a user, (e.g., through a speaker in a handset of device 1150.) Such sound can include sound from voice telephone calls, can include recorded sound (e.g., voice messages, music files, and the like) and also can include sound generated by applications operating on device 1150.

Computing device 1150 can be implemented in a number of different forms, as shown in the figure. For example, it can be implemented as cellular telephone 1180. It also can be implemented as part of smartphone 1182, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such backend, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device implemented method comprising:
receiving, by way of a computing device visual display, data representing one or more user-selected font attributes, wherein each user-selected font attribute indicates a desired descriptive quality graphically represented by a font that invokes a viewer response associated with the descriptive quality for a desired effect, the data including one or more selected interest levels for each of the one or more user-selected font attributes, wherein the one or more selected interest levels for each of the one or more user-selected font attributes is changeable after selection of the respective font attribute, and the one or more selected interest levels represent interest in having the one or more user-selected font attributes being present or being absent in identified fonts;
identifying, by one or more trained learning machines, one or more fonts with respective font attributes representative of the selected interest level for each of the one or more user-selected font attributes, wherein the one or more trained learning machines have been trained using data that represents a listing of fonts for a portion of the user-selected font attributes, wherein the data that represents the listing of fonts is weighted by a biquadratic curve; and
initiating delivery of data representing the one or more identified fonts for user selection on the visual display presented on the computing device.

2. The computing device implemented method of claim 1, wherein the one or more selected interest levels represent interest in having the one or more user-selected font attributes reflected in the one or more identified fonts.

3. The computing device implemented method of claim 1, wherein the one or more selected interest levels represents interest in the one or more user-selected font attributes being absent in the one or more identified fonts.

4. The computing device implemented method of claim 1, wherein identifying, by one or more trained learning machines, the one or more fonts with respective font attributes representative of the one or more selected interest levels for each of the user-selected font attributes employs a trained deep learning machine.

5. The computing device implemented method of claim 1, wherein identifying, by one or more trained learning machines, the one or more fonts with respective font attributes representative of the one or more selected interest levels for each of the user-selected font attributes employs an ensemble of trained deep learning machines.

6. The computing device implemented method of claim 1, wherein data that represents fonts located at the start and end of the font listing are similarly weighted.

7. The computing device implemented method of claim 1, wherein identifying the one or more fonts with respective font attributes representative of the selected interest level for each of the user-selected font attributes includes multiplying a numerical value representing an attribute's presence in a font and a numerical value representing the selected interest level for the attribute.

8. The computing device implemented method of claim 1, wherein at least one of the font attributes is identified from survey data for being user-selectable.

9. A system comprising:
a computing device comprising:
a memory configured to store instructions; and
a processor to execute the instructions to perform operations comprising:
receiving, by way of a computing device visual display, data representing one or more user-selected font attributes, wherein each user-selected font attribute indicates a desired descriptive quality graphically represented by a font that invokes a viewer response associated with the descriptive quality for a desired effect, the data including one or more selected interest levels for each of the one or more user-selected font attributes, wherein the one or more selected interest levels for each of the one or more user-selected font attributes is changeable after selection of the respective font attribute, and the one or more selected interest levels represent interest in having the one or more user-selected font attributes being present or being absent in identified fonts;
identifying, by one or more trained learning machines, one or more fonts with respective font attributes representative of the selected interest level for each of the one or more user-selected font attributes, wherein the one or more trained learning machines have been trained using data that represents a listing of fonts for a portion of the user-selected font attributes, wherein the data that represents the listing of fonts is weighted by a biquadratic curve; and
initiating delivery of data representing the one or more identified fonts for user selection on the visual display presented on the computing device.

10. The system of claim 9, wherein the one or more selected interest levels represent interest in having the one or more user-selected font attributes reflected in the one or more identified fonts.

11. The system of claim 9, wherein the one or more selected interest levels represents interest in the one or more user-selected font attributes being absent in the one or more identified fonts.

12. The system of claim 9, wherein identifying, by one or more trained learning machines, the one or more fonts with respective font attributes representative of the one or more selected interest levels for each of the user-selected font attributes employs a trained deep learning machine.

13. The system of claim 9, wherein identifying, by one or more trained learning machines, the one or more fonts with respective font attributes representative of the one or more selected interest levels for each of the user-selected font attributes employs an ensemble of trained deep learning machines.

14. The system of claim 9, wherein data that represents fonts located at the start and end of the font listing are similarly weighted.

15. The system of claim 9, wherein identifying the one or more fonts with respective font attributes representative of the selected interest level for each of the user-selected font attributes includes multiplying a numerical value representing an attribute's presence in a font and a numerical value representing the selected interest level for the attribute.

16. The system of claim 9, wherein at least one of the font attributes is identified from survey data for being user-selectable.

17. One or more non-transitory computer readable media storing instructions that are executable by a processing device, and upon such execution cause the processing device to perform operations comprising:

receiving, by way of a computing device visual display, data representing one or more user-selected font attributes, wherein each user-selected font attribute indicates a desired descriptive quality graphically represented by a font that invokes a viewer response associated with the descriptive quality for a desired effect, the data including one or more selected interest levels for each of the one or more user-selected font attributes, wherein the one or more selected interest levels for each of the one or more user-selected font attributes is changeable after selection of the respective font attribute, and the one or more selected interest levels represent interest in having the one or more user-selected font attributes being present or being absent in identified fonts;

identifying, by one or more trained learning machines, one or more fonts with respective font attributes representative of the selected interest level for each of the one or more user-selected font attributes, wherein the one or more trained learning machines have been trained using data that represents a listing of fonts for a portion of the user-selected font attributes, wherein the data that represents the listing of fonts is weighted by a biquadratic curve; and initiating delivery of data representing the one or more identified fonts for user selection on the visual display presented on the computing device.

18. The non-transitory computer readable media of claim 17, wherein the one or more selected interest levels represent interest in having the one or more user-selected font attributes reflected in the one or more identified fonts.

19. The non-transitory computer readable media of claim 17, wherein the one or more selected interest levels represents interest in the one or more user-selected font attributes being absent in the one or more identified fonts.

20. The non-transitory computer readable media of claim 17, wherein identifying, by one or more trained learning machines, the one or more fonts with respective font attributes representative of the one or more selected interest levels for each of the user-selected font attributes employs a trained deep learning machine.

21. The non-transitory computer readable media of claim 17, wherein identifying, by one or more trained learning machines, the one or more fonts with respective font attributes representative of the one or more selected interest levels for each of the user-selected font attributes employs an ensemble of trained deep learning machines.

* * * * *